(12) United States Patent
Liu et al.

(10) Patent No.: US 11,365,050 B2
(45) Date of Patent: Jun. 21, 2022

(54) ROBOT CONTROL SYSTEM AND METHOD, COMPUTING DEVICE, AND STORAGE MEDIUM

(71) Applicant: BEIJING GEEKPLUS TECHNOLOGY CO., LTD., Beijing (CN)

(72) Inventors: Kai Liu, Beijing (CN); Mengdi Wang, Beijing (CN); Yixin Bai, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/271,590

(22) PCT Filed: Sep. 11, 2019

(86) PCT No.: PCT/CN2019/105382
§ 371 (c)(1),
(2) Date: Jul. 12, 2021

(87) PCT Pub. No.: WO2020/052592
PCT Pub. Date: Mar. 19, 2020

(65) Prior Publication Data
US 2021/0354919 A1 Nov. 18, 2021

(30) Foreign Application Priority Data

Sep. 12, 2018 (CN) .......................... 201811062251.7
Apr. 1, 2019 (CN) .......................... 201910258694.1

(51) Int. Cl.
*B65G 1/04* (2006.01)
*B65G 1/06* (2006.01)
(Continued)

(52) U.S. Cl.
CPC ......... *B65G 1/0492* (2013.01); *B65G 1/0435* (2013.01); *B65G 1/06* (2013.01);
(Continued)

(58) Field of Classification Search
CPC .................................................. B65G 1/0492
See application file for complete search history.

(56) References Cited

U.S. PATENT DOCUMENTS 5,226,782 A 7/1993 Rigling
9,120,622 B1 * 9/2015 Elazary ................. B25J 9/1697
(Continued)

FOREIGN PATENT DOCUMENTS

CN 204713851 U 10/2015
CN 105184527 A 12/2015
(Continued)

OTHER PUBLICATIONS

Office action dated Apr. 7, 2021 from corresponding Australian Application No. 2019-339988.
(Continued)

*Primary Examiner* — Thomas Randazzo
(74) *Attorney, Agent, or Firm* — ArentFox Schiff LLP

(57) ABSTRACT

Disclosed are a robot control system and method. The robot control system includes a storage region, a lifting machine, a control device, and at least one self-driven robot. The storage region includes a loft having at least two storeys and is configured to store a container, and there is provided a passage on the floor of each of the at least two storeys of the loft for the self-driven robot to move through. The lifting machine is configured to transport the self-driven robot or the container to a target storey corresponding to a transportation task. The control device is configured to assign the transportation task to the self-driven robot and plan a travel route on the target storey for the self-driven robot according (Continued)

to the transportation task, and dispatch the self-driven robot to travel according to the travel route to perform the transportation task.

16 Claims, 10 Drawing Sheets

(51) Int. Cl.
    *G05B 19/418*     (2006.01)
    *B65G 1/137*     (2006.01)
    *B66F 9/06*     (2006.01)
    *G05D 1/00*     (2006.01)
    *G05D 1/02*     (2020.01)

(52) U.S. Cl.
    CPC ........... *B65G 1/065* (2013.01); *B65G 1/1371* (2013.01); *B65G 1/1373* (2013.01); *B66F 9/063* (2013.01); *G05B 19/41895* (2013.01); *G05D 1/0061* (2013.01); *G05D 1/021* (2013.01); *B65G 2203/0216* (2013.01); *G05D 2201/0216* (2013.01)

(56) References Cited

U.S. PATENT DOCUMENTS

| | | | |
|---|---|---|---|
| 9,452,883 B1 | 9/2016 | Wurman et al. | |
| 9,558,472 B1 | 1/2017 | Tubilla Kuri | |
| 2007/0065258 A1* | 3/2007 | Benedict | B65G 1/04 414/266 |
| 2012/0290125 A1* | 11/2012 | Perry | B65G 63/004 700/218 |
| 2014/0124462 A1* | 5/2014 | Yamashita | B65G 1/0485 211/1.57 |
| 2015/0225187 A1* | 8/2015 | Razumov | B65G 1/0492 414/807 |
| 2015/0336741 A1* | 11/2015 | Ahammer | B65G 1/0492 414/281 |
| 2016/0176638 A1 | 6/2016 | Toebes | |
| 2016/0311617 A1* | 10/2016 | Van Den Berk | F16P 1/00 |
| 2017/0057744 A1* | 3/2017 | Warries | B65G 1/0492 |
| 2017/0129704 A1* | 5/2017 | Okazaki | B65G 1/0492 |
| 2017/0137222 A1* | 5/2017 | Lert, Jr. | B65G 1/1378 |
| 2017/0152106 A1* | 6/2017 | Hofmann | B65G 1/1378 |
| 2017/0203921 A1* | 7/2017 | Issing | B65G 1/0407 |
| 2018/0016098 A1 | 1/2018 | Lert et al. | |
| 2018/0211347 A1* | 7/2018 | Chen | G05D 1/0212 |
| 2019/0023492 A1* | 1/2019 | Voloskov | G06Q 10/087 |
| 2019/0026687 A1* | 1/2019 | Voloskov | G06Q 10/087 |
| 2019/0202048 A1* | 7/2019 | Tarbaieva | B25J 5/007 |
| 2019/0245366 A1* | 8/2019 | Coady | H02J 7/0042 |
| 2020/0071077 A1* | 3/2020 | Winkler | B65G 15/00 |
| 2020/0122923 A1* | 4/2020 | Moulin | B65G 1/0435 |
| 2020/0122925 A1* | 4/2020 | Abou-Chakra | B65G 1/0492 |

FOREIGN PATENT DOCUMENTS

| | | |
|---|---|---|
| CN | 205397530 U | 7/2016 |
| CN | 106311615 A | 1/2017 |
| CN | 107720072 A | 2/2018 |
| CN | 207158088 U | 3/2018 |
| CN | 108107862 A | 6/2018 |
| CN | 108146947 A | 6/2018 |
| CN | 207645139 U | 7/2018 |
| CN | 108423355 A | 8/2018 |
| CN | 109048952 A | 12/2018 |
| CN | 109292343 A | 2/2019 |
| CN | 109313731 A | 2/2019 |
| CN | 109969674 A | 7/2019 |
| JP | 2018008775 A | 1/2018 |
| KR | 10-2012-0135246 A | 12/2012 |

OTHER PUBLICATIONS

Office Action dated Jun. 21, 2021 from corresponding Korean Application No. 10-2021-7005066.
International Search Report for corresponding Chinese Application No. PCT/CN2019/105382 dated Dec. 9, 2019.
First Office Action for corresponding Chinese Application No. 201811062251.7 dated Apr. 3, 2020.
First Office Action for corresponding Chinese Application No. 201910258694.1 dated Sep. 27, 2019.
Second Office Action for corresponding Chinese Application No. 201910258694.1 dated Jan. 21, 2020.
Notification to Grant Patent Right for Invention for corresponding Chinese Application No. 201910258694.1 dated Apr. 3, 2020.

\* cited by examiner

ROBOT CONTROL SYSTEM AND METHOD, COMPUTING DEVICE, AND STORAGE MEDIUM

CROSS-REFERENCE TO RELATED APPLICATIONS

The present application is a United States national stage application of co-pending International Patent Application Number PCT/CN2019/105382, filed on Sep. 11, 2019, which claims to the priority of Chinese patent application No. 201811062251.7 filed on Sep. 12, 2018 and Chinese patent application No. 201910258694.1 filed on Apr. 1, 2019, disclosures of which are incorporated herein by reference in their entireties.

TECHNICAL FIELD

The present application relates to the field of warehousing, for example, to a robot control system and method, a computing device, and a storage medium.

BACKGROUND

In goods-to-man broken case picking automated scheme in warehousing, the multi-layer picking scheme used in a three-dimensional space in the related art is mainly implemented by a three-dimensional shuttle vehicle. The three-dimensional shuttle vehicle scheme however has high requirements on shelf precision, and also has relatively high requirements on the ground subsidence index and flatness index. If the ground subsidence index and flatness index do not meet up the standards, the shuttle vehicle would get stuck on a track, leading to a particularly high construction cost. Furthermore, the maintenance for fixing a system failure is complicated, and it is also very dangerous for a person to enter a three-dimensional shelf track. Therefore, manual operation is not possible should a system failure occur.

A container-to-man automated picking scheme based on a robot is a multi-layer picking scheme that addresses the utilization of the three-dimensional space. It usually adopts an ordinary loft-type shelf. A robot moves on the floors of the loft, and there is no need to provide special shelf tracks. A box-pickup mechanism of the robot can be lifted and lowered to pick up containers on shelf layers at different heights on a same floor of the loft. The robot can pick up one or more boxes at a time, and transport them to an operating station. After a sorting operation is completed at the operating station, the robot then returns the box to the shelf. The storey where the operating station is located is an operation floor, and other storeys are storage floors.

When a container located at a storage floor needs to be transported to the operation floor for operation, or a container in one operation floor needs to be transported to another operation floor for operation, then a cross-layer transportation of the container would be required. Currently, a common multi-layer picking scheme adopts the three-dimensional shuttle vehicle, which uses the following container cross-layer transportation scheme, namely a lifting machine works in cooperation with a conveyance line to transport the container to the operating station for operation. However, the three-dimensional shuttle vehicle has a relatively high difficulty of transportation, and is difficult to be flexibly allocated, resulting in a relatively high cost of the automatic picking scheme.

SUMMARY

Embodiments of the present application provide a robot control method and system, a computing device and a storage medium to overcome the deficiencies in the related art.

An embodiment of the present application provides a robot control system including a storage region, a lifting machine, a control device and at least one self-driven robot. The control device is communicatively connected to the lifting machine and the at least one self-driven robot. The storage region includes a loft having at least two storeys and is configured to store a container, and there is provided a passage on the floor of each of the at least two storeys of the loft for the at least one self-driven robot to move through. The lifting machine is configured to transport the at least one self-driven robot or the container to a target storey corresponding to a transportation task. The control device is configured to assign the transportation task to the at least one self-driven robot and plan a travel route on the target storey for the self-driven robot according to the transportation task, and dispatch the at least one self-driven robot to travel according to the travel route to perform the transportation task. The self-driven robot is configured to arrive at a location of a target container on the target storey corresponding to the transportation task according to the travel route corresponding to the transportation task, pick up the target container, and transport the target container to a destination of the transportation task according to the travel route. The container is a work bin stored on a container carrier located in the storage region.

An embodiment of the present application provides a robot control method including: assigning a transportation task to at least one self-driven robot; planning a travel route on a target storey corresponding to the transportation task for the at least one self-driven robot, controlling the at least one self-driven robot to move to a location of a target container corresponding to the transportation task according to the travel route, and picking up the target container; controlling the at least one self-driven robot carrying the target container to move to a position where a lifting machine is located; controlling the lifting machine to transport the at least one self-driven robot to a target storey where a destination of the transportation task is located; and controlling the at least one self-driven robot to transport the target container to the destination of the transportation task.

An embodiment of the present application provides a robot control method including: receiving a transportation task assigned by a control device; moving to a location of a target container corresponding to the transportation task on a target storey corresponding to the transportation task according to a travel route planned by the control device, and picking up the target container; and transporting the target container to a destination of the transportation task according to the travel route.

An embodiment of the present application provides a computing device, including a memory, a processor and computer instructions stored in the memory and executable by the processor. The computer instructions when executed by the processor cause any one of the robot control methods to be performed.

An embodiment of the present application provides a computer-readable storage medium storing computer-executable instructions, which when executed cause any one of the robot control methods to be performed.

DETAILED DESCRIPTION

Details are set forth below to facilitate a thorough understanding of the present application. However, the present application can be implemented in many forms different than the embodiments described herein, and those skilled in the art will be able to make similar expansions without departing from the spirit of the present application, so the present application is not limited by the specific embodiments described below.

Figure 1:
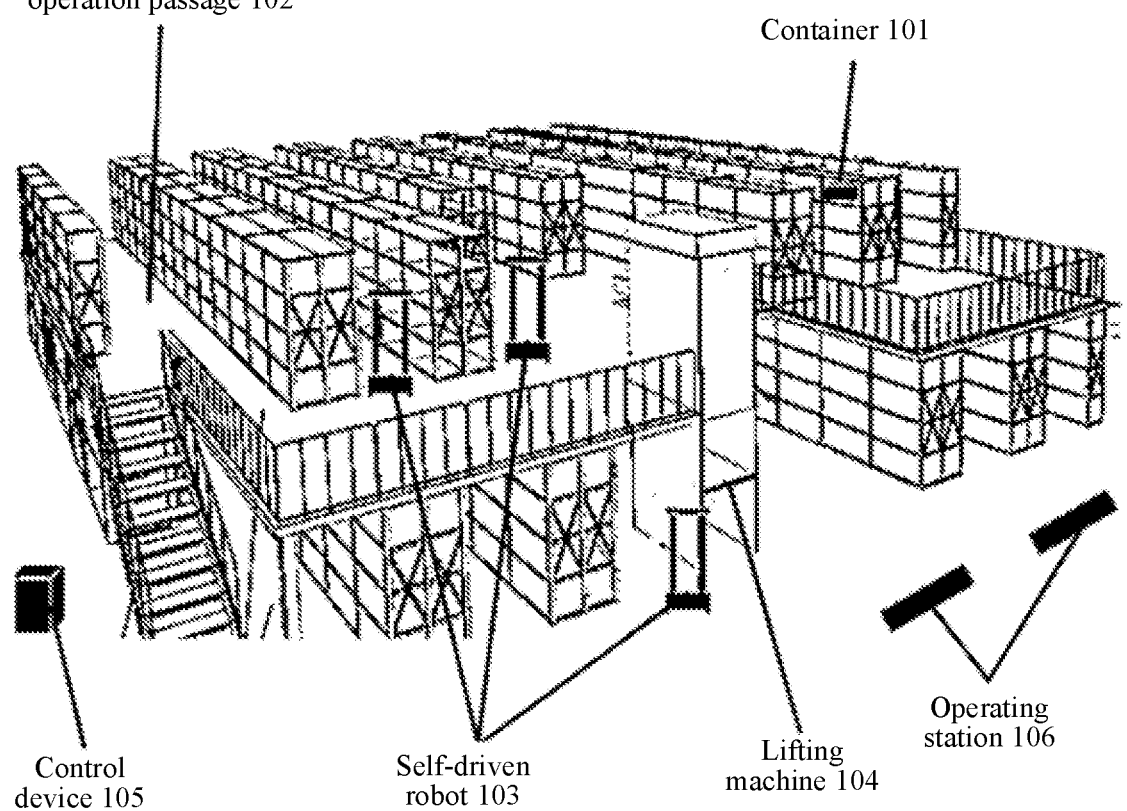
FIG. 1 is a schematic diagram of a robot control system according to an embodiment of the present application.

FIG. 1 shows a robot control system according to an embodiment of the present application. The robot control system includes storage region, a lifting machine 104, a control device 105, an operating station 106 and at least one self-driven robot 103.

The storage region includes a loft having at least two storeys and is configured to store a container 101, and a passage 102 for the at least one self-driven robot to move through is provided on the floor of each of the at least two storeys of the loft.

The container 101 may be a work bin or a packing box on a container carrier, a tray on the container carrier, or other containers that can be used for holding articles.

The container carrier may be a shelf.

The self-driven robot 103 can travel on each storey of the loft through the passage 102 which is configured for the self-driven robot 103 to move through.

The lifting machine 104 is configured to transport the self-driven robot 103 or the container 101 to a target storey corresponding to a transportation task.

The control device 105 is configured to assign the transportation task to the self-driven robot 103 and plan a travel route on the target storey for the self-driven robot 103 according to the transportation task, and dispatch the self-driven robot 103 to travel according to the travel route and perform the transportation task.

The self-driven robot 103 is configured to arrive at a location of a target container on the target storey corresponding to the transportation task according to the travel route corresponding to the transportation task to pick up the target container, and transport the target container to a destination of the transportation task according to the travel route.

The control device 105 is communicatively connected to the lifting machine 104 and the self-driven robot 103.

The storage region is provided with the operating station 106 on at least one floor of the loft, and the operating station 106 is used for performing a task operation on the container 101. The task operation may be operations such as a pickup operation, a stocktaking operation, a good pickup operation and a tallying operation.

In the robot control system provided by the embodiment of the present application, the passage for the self-driven robot to move through is provided on the floor of each storey of the loft and the lifting machine is combined, such that the self-driven robot can run on each storey. In this way, flexibility of the self-driven robot is improved, various operations can be completed according to actual requirements, and there is no need to install shuttle tracks, thereby greatly reducing a construction cost.

Figure 2:
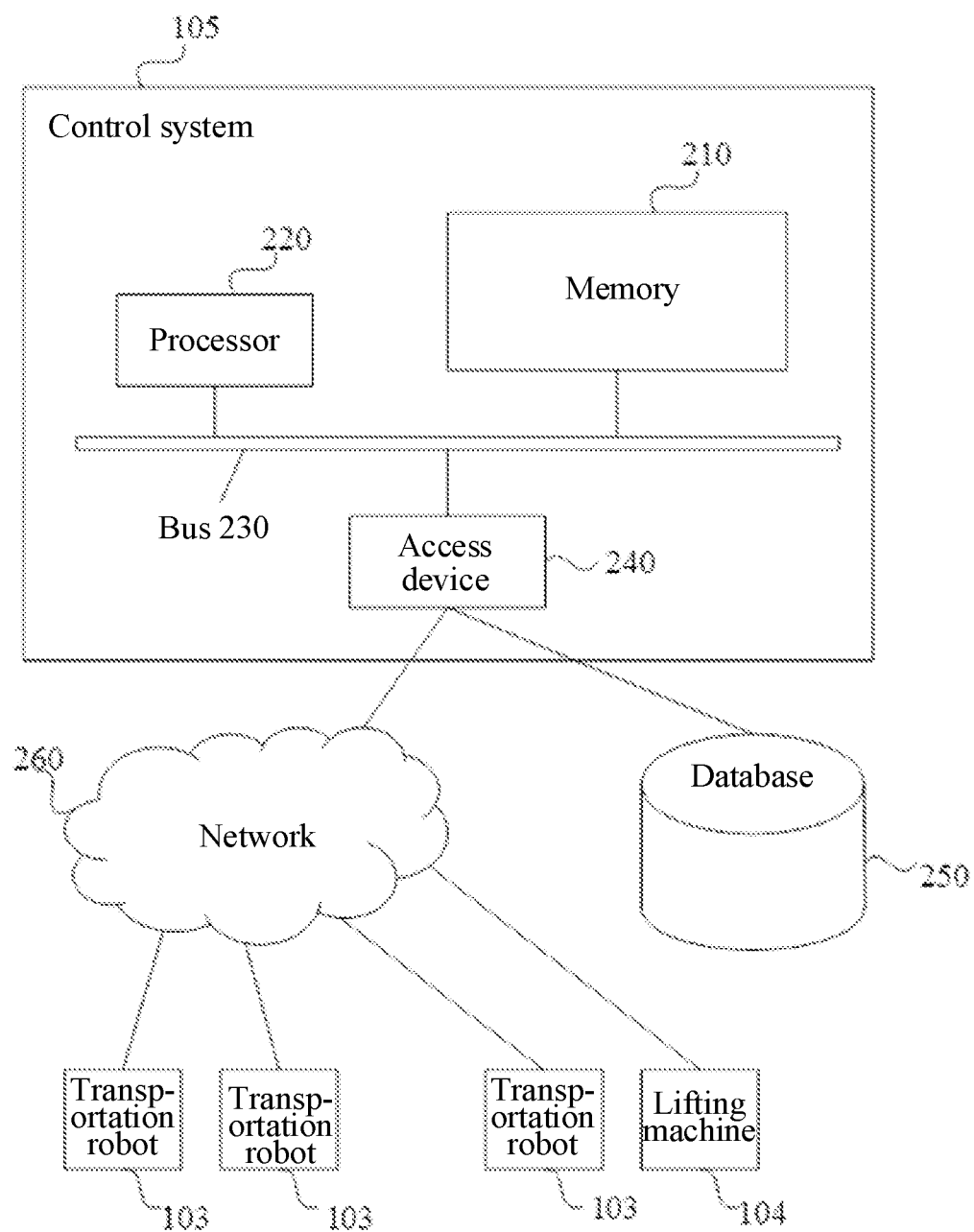
FIG. 2 is a schematic diagram illustrating a communication framework of a robot control device according to an embodiment of the present application.

FIG. 2 shows schematic diagram of a communication framework of a robot control device according to an embodiment of the present application.

Components of a control device 105 include, but are not limited to, a memory 210 and a processor 220. The processor 220 is connected to the memory 210 through a bus 230, and a database 250 is configured to store a transportation task.

The control device 105 further includes an access device 240 that enables the control device 105 to communicate through one or more networks 260. Examples of the networks include a public switched telephone network (PSTN), a local area network (LAN), a wide area network (WAN), a personal area network (PAN), or a combination of communication networks such as the Internet. The access device 240 may include one or more of any type of network interfaces (such as, a network interface card (NIC)) of wired or wireless, such as an IEEE 802.11 wireless local area network (WLAN) wireless interface, a worldwide interoperability for microwave access (Wi-MAX) interface, an ethernet interface, a universal serial bus (USB) interface, a cellular network interface, a bluetooth interface and a near field communication (NFC) interface.

In one embodiment of the present application, the above-mentioned of the control device 105 and other components not shown in FIG. 2 may also be connected to each other, for example, by the bus.

The control device 105 may be any type of stationary or mobile computing device including a mobile computer or mobile computing device (such as, a tablet computer, a personal digital assistant, a laptop computer, a notebook computer and a netbook), a mobile phone (such as a smart phone), a wearable computing device (such as a smart watch and smart glasses) or other types of mobile devices, or a stationary computing device such as a desktop computer or a personal computer (PC). The control device 105 may further be a mobile or stationary server.

The control device 105 is communicatively connected to a self-driven robot 103 and a lifting machine through the network 260, and controls the robot control system by transmitting control instructions or receiving a message returned by the self-driven robot or the lifting machine.

In one embodiment of the present application, a transportation task may carry a code identifier of a target container; and at least one self-driven robot moves to a location of a target container on a target storey according to a travel route, and can pick up the target container by recognizing the code identifier of the target container.

It is to be noted that the embodiment of the present application does not limit a structure of the self-driven robot, and a function of taking out the container from the shelf and putting the container into the shelf can be achieved by any one of the structures in the related art. For example, a mechanical arm may be arranged on the self-driven robot, and the mechanical arm is used to pick up the container from the shelf and put the container into the shelf; a clamping structure may also be arranged on the self-driven robot, and the container is taken out from the shelf and put into the shelf by being clamped; or the container may be taken out from the shelf and put into the shelf using other structures.

Figure 3:
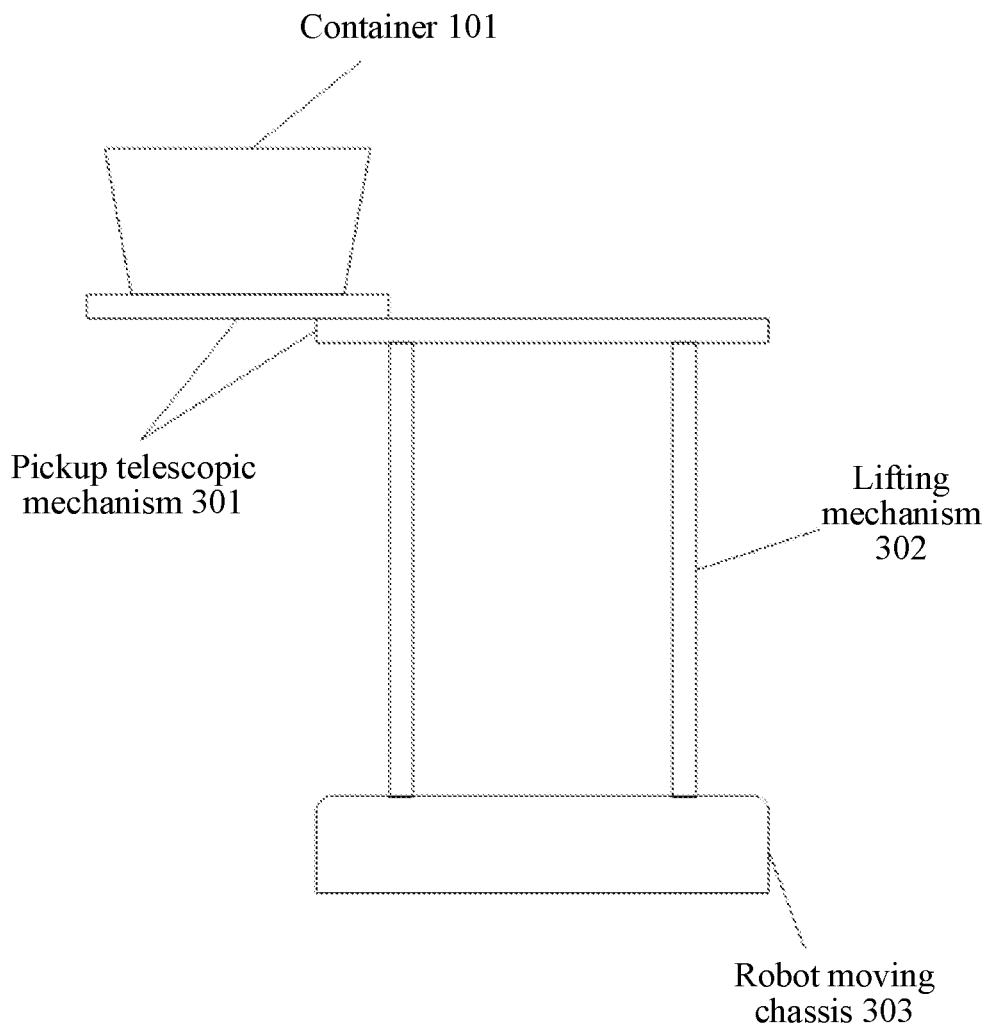
FIG. 3 is a schematic diagram of a self-driven robot in a robot control system according to an embodiment of the present application.

Referring to FIG. 3, in one embodiment of the present application, at least one self-driven robot 103 includes a pickup telescopic mechanism 301, a lifting mechanism 302, and a robot moving chassis 303.

The pickup telescopic mechanism 301 is configured to obtain one or more target containers.

The lifting mechanism 302 is configured to adjust the pickup telescopic mechanism 301 to move upwards or downwards such that the pickup telescopic mechanism obtains target containers on shelves of different heights of a target storey.

The robot moving chassis 303 is configured to control the at least one self-driven robot to move through on a travel passage of the target storey according to a travel route planned by a control device.

The target container is a container 101 which needs to be transported in a transportation task.

The self-driven robot provided by the embodiment of the present application runs on a travel passage on the floor of each storey of the loft, such that flexibility for transporting the container is greatly improved, various operations can be completed according to actual requirements, and there is no need to install shuttle tracks, thereby greatly reducing a construction cost.

Figure 4:
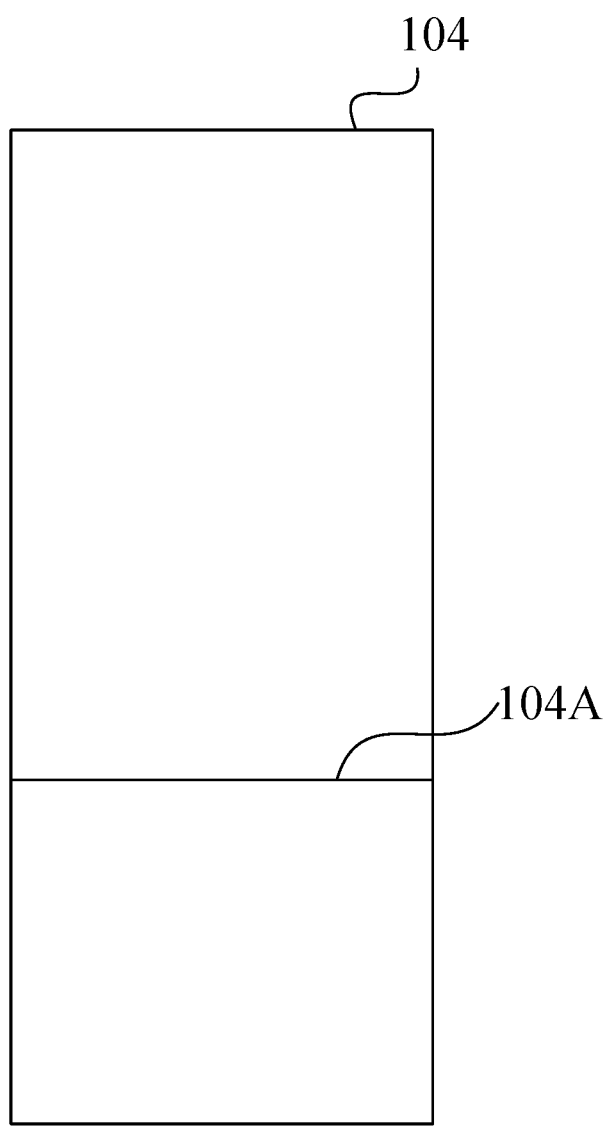
FIG. 4 is a schematic diagram of a lifting machine in a robot control system according to an embodiment of the present application.

Referring to FIG. 4, in one embodiment of the present application, a lifting machine 104 is provided with a temporary storage position 104A configured to temporarily store a self-driven robot 103 or a target container.

The target container is a container 101 which needs to be transported in a transportation task.

Figure 5:
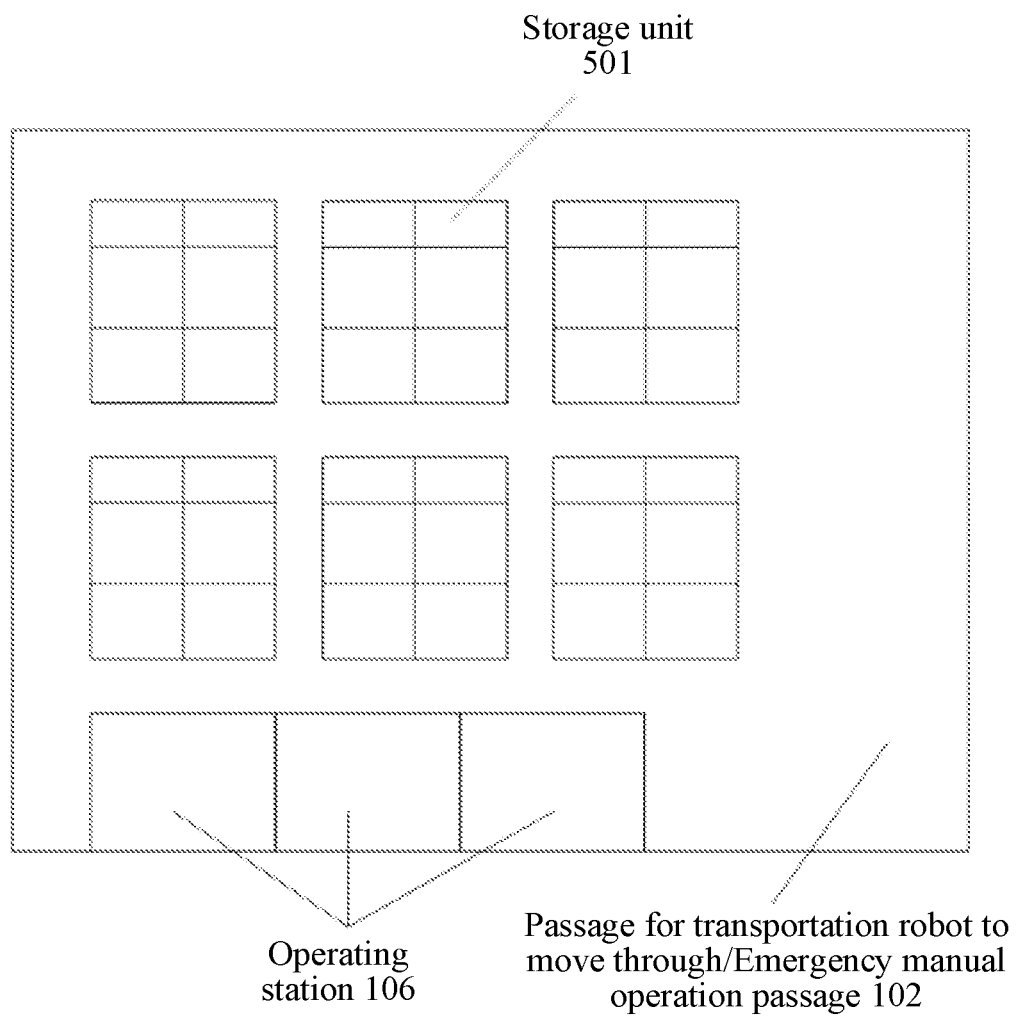
FIG. 5 is a plan view of a storey of a storage region in another robot control system according to an embodiment of the present application.

FIG. 5 is a plan view of a storey according to an embodiment of the present application. The storey includes a storage unit 501 of a shelf, an operating station 106 and a travel passage 102.

The storage unit 501 of the shelf is used for storing a container.

Operations such as a pickup operation, a stocktaking operation, a replenishment operation or a tallying operation may be performed on items in a transported container on a plurality of operating stations 106.

The travel passage 102 is used for a self-driven robot to move through.

In the embodiment of the present description, a storage region includes a loft having at least two storeys. In a case where the container needs to be transported between different storeys, the container may be transported by using a lifting machine.

The embodiment of the present application provides two modes of lifting a robot and lifting a container.

The two modes are illustrated respectively below.

In one embodiment of the present application, a transportation task consists of a first transportation task and a second transportation task. In the first transportation task, a target container needs to be transported to a temporary storage position of the lifting machine. In the second transportation task, a self-driven robot carrying the target container needs to be transported to an operating station or a container carrier of a target storey. This scheme is a lifting a robot mode. A control device controls a first self-driven robot to arrive at a location of a target container on a target storey corresponding to the first transportation task according to a first travel route corresponding to the first transportation task to pick up the target container and transport the target container to the temporary storage position of the lifting machine, and then a ready status signal is transmitted to the control device.

The container carrier may be the storage unit of the shelf.

A destination of the second transportation task includes an operating station or a storage unit of a shelf of a target storey of the second transportation task. The control device receives the ready status signal, and controls the lifting machine to transport the first self-driven robot to the target storey of the second transportation task; and controls the first self-driven robot to move through on the target storey of the second transportation task according to a second travel route corresponding to the second transportation task, and transport the target container to the operating station or the storage unit of the shelf of the target storey of the second transportation task.

In the lifting the robot mode, the self-driven robot can arrive at different storeys by the lifting machine, such that each self-driven robot can obtain a container of any storey and transport the container to an operating station of any storey, and after an operation on the container is completed at the operating station, the self-driven robot can return the container to a storage unit of a shelf of any storey.

It is to be noted that in the lifting the robot mode, whether the self-driven robot being lifted carries the container may be determined according to an actual situation, which is not limited in the present application.

In another embodiment of the present application, a transportation task consists of a first transportation task and a second transportation task. In the first transportation task, a target container needs to be transported to a temporary storage position of the lifting machine. In the second transportation task, the target container needs to be transported to an operating station or a storage unit of a shelf of a target storey. This scheme is a lifting the container mode. A second self-driven robot arrives at a location of the target container on a target storey corresponding to the first transportation task according to the first travel route corresponding to the first transportation task to pick up the target container and transports the target container to the temporary storage position of the lifting machine, and then a ready status signal is transmitted to the control device.

A destination of the second transportation task is an operating station or a storage unit of a shelf of a target storey of the second transportation task. The control device receives the ready status signal, and controls the lifting machine to lift the target container to the target storey; and controls a third self-driven robot located at the target storey to move through on the target storey according to a second travel route corresponding to a second transportation task, and transport the target container to the operating station or the storage unit of the shelf of the target storey of the second transportation task. The second self-driven robot is different from the third self-driven robot.

In the lifting the container mode, the container can be transported to an operating station or a storage unit of a shelf of any storey through a cooperation between the self-driven robots located at different storeys and the lifting machine.

In one embodiment of the present application, in the lifting the container mode, the lifting machine may further be connected to a roller line of the operating station. The control device receives the status signal transmitted by the lifting machine, controls the lifting machine to transport the target container to a target storey of a third transportation task, and controls the lifting machine to convey the target container to the roller line through which the target container is transported to the operating station.

In practical application, the roller line may further be configured to receive a container with which a task operation has been completed at the operating station, and the task operation may be the pickup operation.

In one embodiment of the present application, the control device may further control the lifting machine to pick up the target container from the roller line and place the target container at the temporary storage position of the lifting machine, and transport the target container to the target storey of the transportation task. The control device controls the self-driven robot located on the target storey to pick up the target container from the temporary storage position of the lifting machine, and transport the target container to the destination of the transportation task.

After the self-driven robot carrying the target container moves to the operating station, the control device can control the self-driven robot to queue up at the operating station and wait for the task operation. After the task operation is completed, the control device controls the self-driven robot to carry the target container with which the task operation has been completed, and transport the target container to a next operating station or return the target container to the storage unit in the shelf.

In order to improve a working efficiency of the self-driven robot, after the self-driven robot pushes the target container to the operating station, the target container is pushed to a storage position of the operating station, and the control device can control the self-driven robot to obtain at least one operable container other than the target container and transport the at least one operable container to the storage unit.

The storage position of the operating station may be a cache shelf or temporary storage roller line of the operating station.

The operable container may be the container that has completed the task operation.

In one embodiment of the present application, the control device is further configured to: receive and store a code of the target container, and perform a popularity evaluation for the target container according to a popularity and quantity of items stored in the target container; control the self-driven robot to transport a target container whose popularity exceeds a preset threshold to a storage unit of a shelf in a preset region, and record a binding relationship between the target container and the storage unit; or control the self-driven robot to transport the target container to a storage unit of a shelf by an increasing distance from the operating station according to a descending order of the popularity of the target container, and record a binding relationship between the target container and the storage unit.

The preset region may be a region where a storage unit which is relatively close to the operating station is located, for example, may be a storage unit 3 meters or 5 meters away from the operating station. In this way, a container in which frequently taken and used items are located is stored in a storage unit which is relatively close to the operating station, thus reducing time required for transporting and improving a business processing efficiency.

A container shelf is a shelf placed on each floor of the loft in the storage region, each container shelf has a plurality of storage units, and each storage unit can store one container.

In one embodiment of the present application, the passage for the self-driven robot to move through may be configured for an emergency manual operation.

In addition, the storage region may further be provided with a walking ladder or an elevator.

When a system goes wrong, for example, in a condition that power fails, or a system is unable to work normally, workers perform the transportation task on travel passages of a plurality of storeys through the walking ladder or the elevator to complete the emergency manual operation.

In order to accurately determine a position of the container, the container is provided with the code identifier for identification, and the code identifier may be a two-dimensional code, a radio frequency identification (RFID) tag and the like.

Based on the robot operating system described above, a variety of business processes can be completed. A put-in storage process with full container load, a put-in storage process and a work flow of the operating station are described as an example below.

A replenishment process refers to that items are not put in storage together with the container and the items are put in the existing container. The work at the operating station includes works such as out-of-warehouse, stocktaking or tallying.

In one embodiment of the present application, the put-in storage process with full container load includes steps described below.

In step (1), the control device receives a container number, a product number, and a quantity of the items and records a binding relationship. One container can bind various items.

In step (2), the control device determines whether there is an empty container in a container shelf. Based on a determination result that there is the empty container on the container shelf, the control device dispatches the self-driven robot to obtain the empty container and transport the empty container to the operating station, and controls the self-driven robot to queue up at the operating station. Based on a determination result that there is no empty container in the storage unit, the control device directly controls the self-driven robot to queue up at the operating station.

When the self-driven robot needs to move up or down through the storeys in a transportation path, the self-driven robot is transported to a corresponding floor by the lifting machine. Step (2) and step (1) may be performed simultaneously.

In step (3), the self-driven robot obtains the container, detects the code of the container and submits the code of the container to the control device, and the control device records the container number of the container transported by the self-driven robot.

In step (4), the control device allocates the container to a corresponding storage unit of a shelf according to a popularity and quantity of the items in the container.

In step (5), in a condition that containers are put in all container temporary storage positions of the self-driven robot, or there is no remaining container to be put into storage at the operating station, the control device dispatches the self-driven robot to leave the operating station, and plans an optimal path sequence for returning the container for the self-driven robot, and the self-driven robot moves to positions of storage units allocated by the system sequentially and puts the container into the storage unit. When the self-driven robot needs to move up or down through the storeys in a path, the self-driven robot is transported to a corresponding floor by the lifting machine.

In one embodiment of the present application, the replenishment process includes steps described below.

In step (1), the control device selects a plurality of containers capable of storing items according to items needing to be stored in the storage.

The plurality of containers may be empty containers or containers having items but still having a storage space.

The control device controls the self-driven robot to obtain the containers and transport the containers to the operating station, and the self-driven robot queues up at the operating station. When the self-driven robot needs to move up or down through the storeys in a path, the self-driven robot is transported to a corresponding floor by the lifting machine.

In step (2), a product code and a container code are received, a binding relationship between the container and the items is recorded, and the self-driven robot is controlled to receive the items through the container.

In step (3), in a condition that the replenishment operation is completed currently at the operating station or a container currently carried by the self-driven robot has no storage space, the condition is fed back through an interactive interface of the control device, and the control device allocates the container to a storage unit of a corresponding container shelf according to the popularity and quantity of the items in the container.

In step (4), the control device dispatches the self-driven robot to leave the operating station, and plans an optimal path sequence for returning the container for the self-driven robot, and the self-driven robot moves to a position of the storage unit allocated by the control device and puts the container into the storage unit. When the self-driven robot needs to move up or down through the storeys in the path, the self-driven robot is transported to a corresponding floor by the lifting machine.

In one embodiment of the present application, the work flow of the operating station includes steps described below.

In step (1), the operating station starts a work, the control device hits a plurality of containers according to a work document, the control device allocates the self-driven robot to obtain the containers and transport empty containers to the operating station, and the self-driven robot queues up at the operating station. When the self-driven robot needs to move up or down through the storeys in a path, the self-driven robot is transported to a corresponding floor by the lifting machine.

In step (2), the work is performed at the operating station, and that an operation on the container carried currently by the self-driven robot is completed is fed back to the control device through an interactive interface of the control apparatus.

In step (3), the control device allocates the container to a storage unit of a corresponding shelf according to a popularity and quantity of current items in the container.

In step (4), the control device dispatches the self-driven robot to leave the operating station, and plans an optimal path sequence for returning the container for the self-driven robot, and the self-driven robot moves to positions of the storage units allocated by a system in sequence and puts the container into the storage unit. When the self-driven robot needs to move up or down through the storeys in the path, the self-driven robot is transported to a corresponding floor by the lifting machine.

In the robot control system provided by the embodiment of the present application, the passage for the self-driven robot to move through is provided on the floor of each storey of the loft and the lifting machine is combined, such that the self-driven robot can run on each storey. In this way, flexibility of the self-driven robot is improved, various operations can be completed according to actual requirements, and there is no need to install shuttle tracks, thereby greatly reducing a construction cost.

Figure 6:
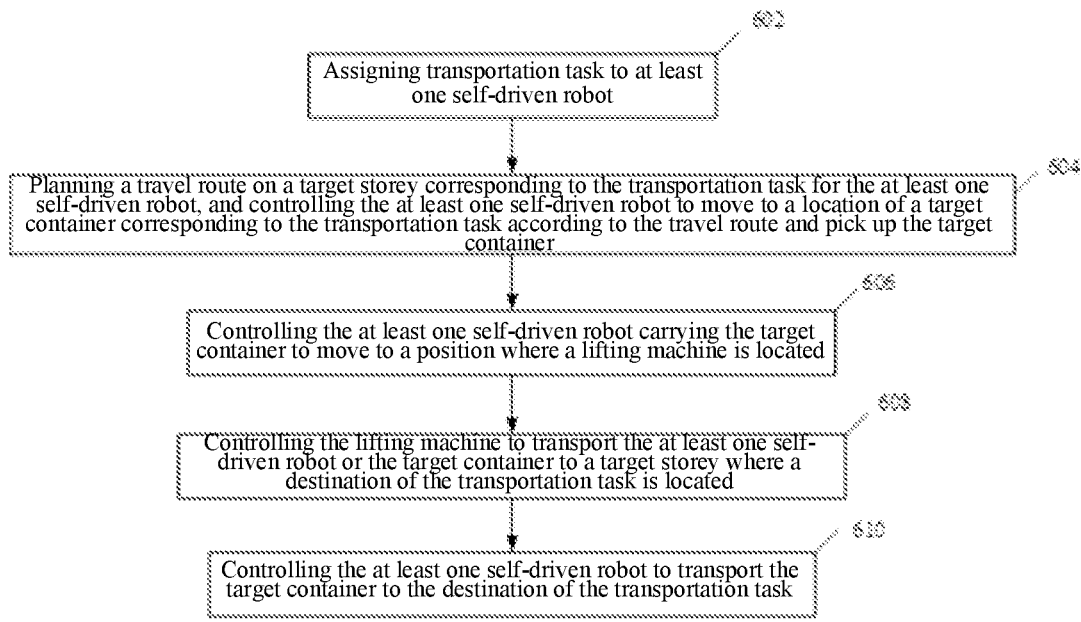
FIG. 6 is a flowchart of a robot control method according to an embodiment of the present application.

FIG. 6 illustrates a robot control method according to an embodiment of the present application. The robot control method is applied to a control device side, and includes step 602 to step 610.

In step 602, a transportation task is assigned to at least one self-driven robot.

In one embodiment of the present application, the transportation task carries a code identifier of the target container.

In practical application, the code identifier may be a two-dimensional code or an RFID tag.

In step 604, a travel route on a target storey corresponding to the transportation task is planned for the at least one self-driven robot, and the at least one self-driven robot is controlled to move to a location of a target container corresponding to the transportation task according to the travel route to pick up the target container.

In one embodiment of the present application, a storage region includes a loft having at least two storeys and is configured to store a container, and a passage for the self-driven robot to move through is provided on the floor of each of the at least two storeys of the loft.

In step 606, the at least one self-driven robot carrying the target container is controlled to move to a position where a lifting machine is located.

In one embodiment of the present application, the lifting machine is provided with a temporary storage position configured to temporarily store the at least one self-driven robot or the target container.

In a process that the self-driven robot moves to the temporary storage position of the lifting machine, the control device can plan an optimal travel route for the at least one self-driven robot and control the at least one self-driven robot to travel according to the travel route to avoid collision.

In step 608, the lifting machine is controlled to transport the at least one self-driven robot or the target container to a target storey where a destination of the transportation task is located.

In step 610, the at least one self-driven robot is controlled to transport the target container to the destination of the transportation task.

In one embodiment of the present application, the transportation task carries the code identifier of the target container.

The control device controls the at least one self-driven robot to pick up the target container by recognizing the code identifier of the target container.

The lifting machine is provided with a temporary storage position configured to temporarily store the at least one self-driven robot or the target container.

In one embodiment, the transportation task includes a first transportation task, and a destination of the first transportation task includes the temporary storage position of the lifting machine. The control device controls a first self-driven robot in the at least one self-driven robot to arrive at a location of a target container of a target storey corresponding to the first transportation task according to a first travel route corresponding to the first transportation task to pick up the target container.

In one embodiment, the transportation task further includes a second transportation task, and a destination of the second transportation task includes an operating station or a storage unit of a shelf of a target storey of the second transportation task. The control device receives a ready status signal transmitted by the first self-driven robot. The control device controls the lifting machine to transport the first self-driven robot to the target storey of the second transportation task. The control device controls the first self-driven robot to move through on the target storey of the second transportation task according to a second travel route of the second transportation task, and transport the target container to the operating station or the storage unit of the shelf of the target storey of the second transportation task.

In another embodiment of the present application, the transportation task includes a first transportation task, and a destination of the first transportation task includes the temporary storage position of the lifting machine. The control device controls a second self-driven robot in the at least one self-driven robot to arrive at a location of a target container of a target storey corresponding to the first transportation task according to a first travel route corresponding to the first transportation task to pick up the target container, and controls the second self-driven robot to transport the target container to the temporary storage position of the lifting machine.

The transportation task further includes a second transportation task, and a destination of the second transportation task includes an operating station or a storage unit of a shelf of a target storey of the second transportation task. The control device receives a ready status signal transmitted by the second self-driven robot. The control device controls the lifting machine to transport the target container to the target storey of the second transportation task. The control device controls a third self-driven robot in at least two self-driven robots to move through on the target storey of the second transportation task according to a second travel route of the second transportation task, and transport the target container to the operating station or the storage unit of the shelf of the target storey of the second transportation task. The second self-driven robot is different from the third self-driven robot.

In another embodiment of the present application, the transportation task further includes a third transportation task, and a destination of the third transportation task includes an operating station of a target storey of the third transportation task. The lifting machine is connected to a roller line of the operating station. The control device receives the ready status signal transmitted by the second self-driven robot, controls the lifting machine to transport the target container to the target storey of the third transportation task, and controls the lifting machine to transfer the target container to the roller line through which the target container is conveyed to the operating station.

In one embodiment, the control device further controls the roller line to receive a container that has completed a pickup operation.

When the location of the target container is the roller line, the control device controls the lifting machine to pick up the target container from the roller line, place the target container in the temporary storage position of the lifting machine, and transport the target container to the target storey of the transportation task.

In one embodiment of the present application, the control device controls the at least one self-driven robot to pick up the target container from the temporary storage position of the lifting machine on the target storey of the transportation task, and transport the target container to the destination of the transportation task.

In one embodiment of the present application, the control device controls the at least one self-driven robot carrying the target container to move to the operating station, and queue up at the operating station to wait for the task operation. The work includes works such as out-of-warehouse, stocktaking or tallying. After the task operation is completed, the at least one self-driven robot is controlled to carry a target container with which the task operation has been completed.

The control device may further control the at least one self-driven robot to push the target container to a cache shelf or a temporary storage roller line of the operating station after the at least one self-driven robot moves to the operating station, and obtain at least one operable container other than the target container.

The destination of the transportation task includes the storage unit of the shelf. A step of the control device controlling the at least one self-driven robot to transport the target container to the destination of the transportation task includes steps described below. A code of a target container with which the task operation has been completed transmitted by the self-driven robot is received. A popularity of the target container is evaluated according to a popularity and quantity of items stored in the target container with which the task operation has been completed. The self-driven robot is controlled to transport a target container whose popularity exceeds a preset threshold to a storage unit of a shelf in a preset region, and a binding relationship between the target container and the storage unit is recorded; or the self-driven robot is controlled to transport the container to a storage unit of a shelf by an increasing distance from the operating station according to a descending order of the popularity of the container, and a binding relationship between the container and the storage unit is recorded.

In the robot control method provided by the embodiment of the present application, the lifting machine is combined, such that the self-driven robot can be controlled to move through on the passage for the self-driven robot to move through provided on the floor of each storey of the loft. In this way, flexibility of the self-driven robot is greatly improved, various operations can be completed according to actual requirements, and there is no need to install the shuttle tracks, thereby greatly reducing a construction cost.

Figure 7:
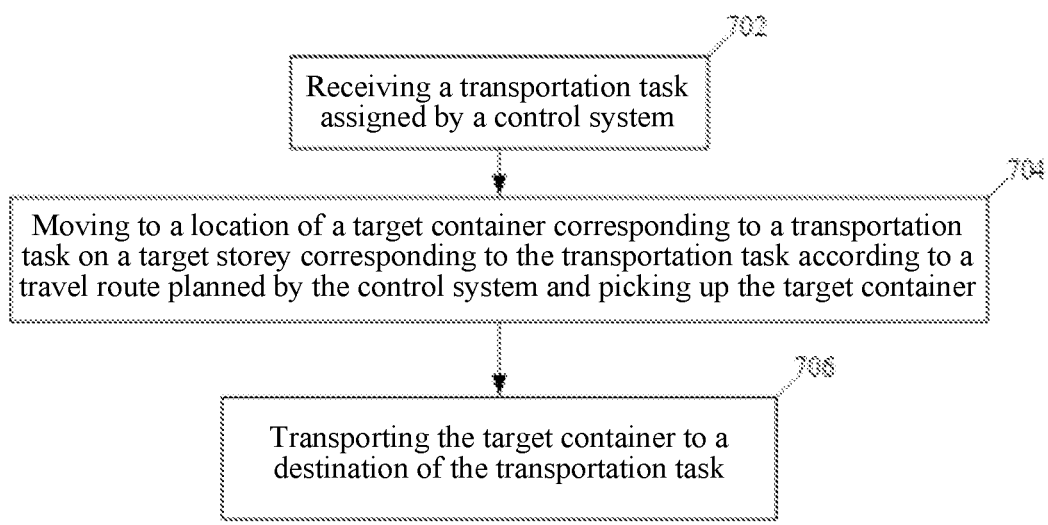
FIG. 7 is a flowchart of a robot control method according to an embodiment of the present application.

FIG. 7 illustrates another robot control method according to an embodiment of the present application. The robot control method is applied to a self-driven side, and includes step 702 to step 706.

In step 702, a transportation task assigned by a control device is received.

In step 704, a self-driven robot moves to a location of a target container corresponding to the transportation task on a target storey corresponding to the transportation task according to a travel route planned by the control device to pick up the target container.

The target storey is a certain floor of a storage region having at least two storeys of the loft. A passage for the self-driven robot to move through is provided on the floor of each of the at least two storeys of the loft of the storage region.

In step 706, the target container is transported to a destination of the transportation task according to the travel route.

In one embodiment, the transportation task carries a code identifier of the target container; and the self-driven robot picks up the target container by recognizing the code identifier of the target container.

In one embodiment of the present application, the transportation task includes a first transportation task, and a destination of the first transportation task includes a temporary storage position of a lifting machine. The self-driven robot arrives at a location of a target container of a target storey corresponding to the first transportation task according to a first travel route corresponding to the first transportation task to pick up the target container. The self-driven robot carries the target container to arrive at the temporary storage position of the lifting machine, and transmits a ready status signal to the control device.

The transportation task further includes a second transportation task, and a destination of the second transportation task includes an operating station or a storage unit of a shelf of a target storey of the second transportation task. The self-driven robot carries the target container to arrive at the target storey of the second transportation task by the lifting machine. The self-driven robot runs on the target storey of the second transportation task according to a second travel route of the second transportation task, and transports the target container to the operating station or the storage unit of the shelf of the target storey of the second transportation task.

In one embodiment of the present application, the transportation task includes a first transportation task, and a destination of the first transportation task includes a temporary storage position of a lifting machine. The self-driven robot arrives at a location of a target container of a target storey corresponding to the first transportation task according to a first travel route corresponding to the first transportation task to pick up the target container. The self-driven robot carries the target container to the temporary storage position of the lifting machine, and transmits a ready status signal to the control device.

In one embodiment of the present application, the transportation task includes a second transportation task, a destination of the second transportation task includes an operating station or a storage unit of a shelf of a target storey of the second transportation task, and a location of the target container of the second transportation task is a temporary storage position of a lifting machine. The target container of the second transportation task is acquired from the temporary storage position of the lifting machine, and the self-driven robot located on the target storey of the second transportation task picks up the target container of the second transportation task from the temporary storage position of the lifting machine. The self-driven robot runs on the target storey of the second transportation task according to a second travel route of the second transportation task, and transports the target container to the operating station or the storage unit of the shelf of the target storey of the second transportation task.

The self-driven robot carrying the target container moves to the operating station and queues up at the operating station to wait for a pickup operation. After the pickup operation is completed, the self-driven robot carries the target container that has completed the pickup operation, and transports the target container to a next operating station or returns the target container to the shelf.

The self-driven robot pushes the target container to a cache shelf or a temporary storage roller line of the operating station, and obtains at least one operable container by a set pickup telescopic mechanism.

In one embodiment of the present application, the destination of the transportation task includes the storage unit of the shelf. A step of transporting the target container to the destination of the transportation task includes steps described below. The self-driven robot detects a code of a container that has completed the pickup operation and transmits the code to the control device. A container where items are located, whose popularity exceeds a preset threshold, is transported to a storage unit of a shelf in a preset region; or the container is transported to a storage unit of a shelf from by an increasing distance from the operating station according to a descending order of the popularity of the containers.

In the robot control method provided by the embodiment of the present application, the lifting machine is combined, such that the self-driven robot can run on the passage for the self-driven robot to move through provided on the floor of each storey of the loft. In this way, flexibility of the self-driven robot is greatly improved, various operations can be completed according to actual requirements, and there is no need to install shuttle tracks, thereby greatly reducing a construction cost.

Figure 8:
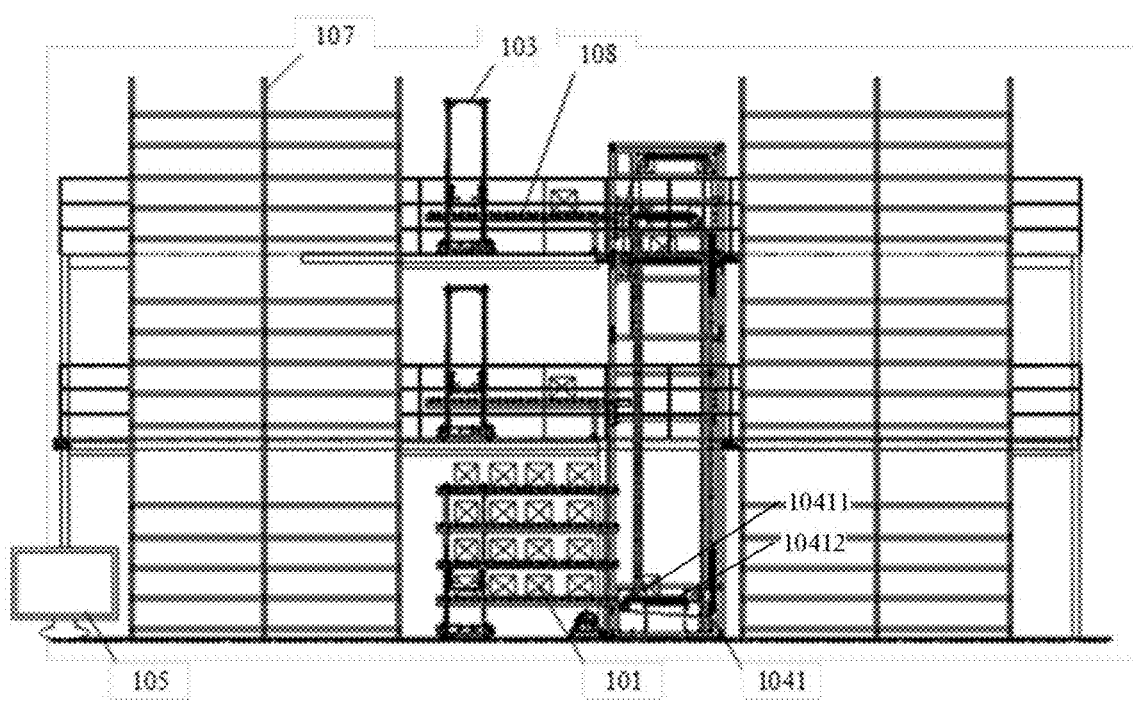
FIG. 8 is a schematic diagram of a robot control system according to another embodiment of the present application.
Figure 13:
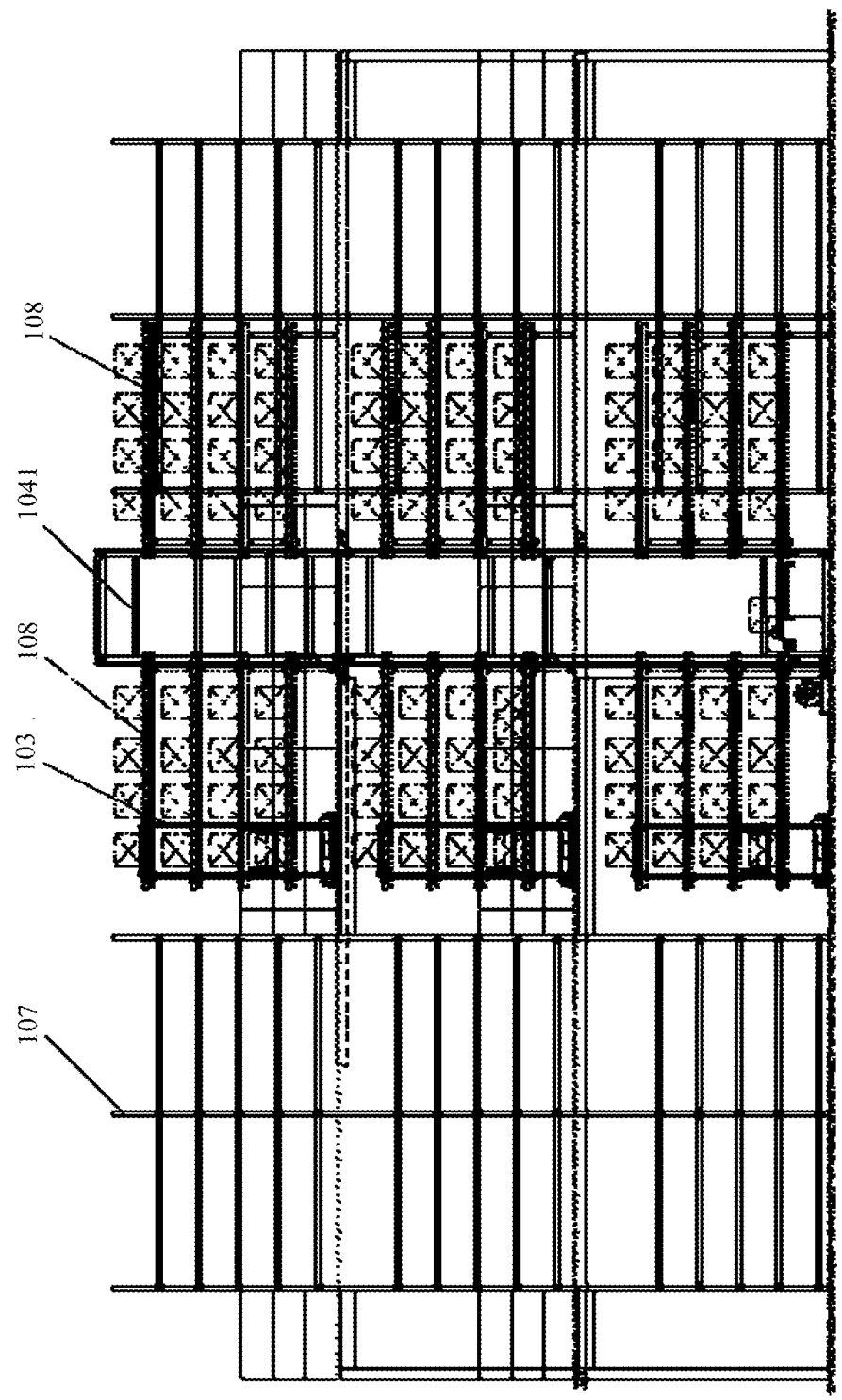
FIG. 13 is a schematic diagram of a robot control system according to another embodiment of the present application.

FIG. 8 and FIG. 13 show a robot control system according to an embodiment of the present application. The robot control system includes a storage region, a container 101, a self-driven robot 103, a container lifting machine 1041, a control device 105 and a temporary storage mechanism 108.

The storage region includes at least two storeys of the loft 107 and is configured to store the container 101, and a passage for the self-driven robot 103 to move through is provided on the floor of the loft 107. Each storey of the loft 107 is provided with at least one self-driven robot 103 and at least one temporary storage mechanism 108.

In the embodiment of the present application, the container 101 may be a work bin or a container 101 on the container carrier, a tray on the container carrier, or other containers that can be used for holding articles. The self-driven robot 103 runs on a storey where the self-driven robot 103 is located and acquires one or more containers 101 through the passage for the self-driven robot 103 to move through. Meanwhile, workers can work on the passage of the loft 107, that is, an operating station 106 can be provided on each storey of the loft 107 to perform operations such as a pickup operation, a stocktaking operation, a good pickup operation or a tallying operation on the container 101.

The control device 105 is configured to assign a transportation task to the self-driven robot 103 and plan a travel route on the storey for the self-driven robot 103 according to the transportation task, and dispatch the self-driven robot 103 to travel according to the travel route and perform the transportation task.

The control device 105 is further configured to assign the transportation task to the self-driven robot 103 and plan the travel route on the storey for the self-driven robot 103 according to the transportation task, and control the self-driven robot 103 to move through on the storey where the self-driven robot 103 is located according to the travel route and perform the transportation task. The transportation task includes that the self-driven robot 103 picks up the target container at a first target position of the storey where the self-driven robot 103 is located, and transports the target container to the temporary storage mechanism 108; and/or, the self-driven robot 103 picks up the target container at the temporary storage mechanism 108 and transports the target container to a second target position of the storey where the self-driven robot 103 is located. The first target position refers to a position of the target container when the self-driven robot 103 picks up the target container according to the transportation task. The second target position refers to a position of the target container when the self-driven robot 103 places the target container according to the transportation task. The first target position may be the same as or different from the second target position.

In the embodiment of the present application, the control device 105 can store a correspondence relationship between the container 101 and a storage vacancy of the container carrier of the loft 107 and inventory information of the container carrier of the loft 107, thereby generating the transportation task according to a document that need to work, and allocating the self-driven robot 103 to perform the transportation task. Meanwhile, the control device 105 can further plan a path and dispatch the self-driven robot 103 to implement the path to avoid collision. The control device 105 is communicatively connected to the container lifting machine 1041, the temporary storage mechanism 108 and the self-driven robot 103 such that the self-driven robot 103 is docked to the temporary storage mechanism 108, and the temporary storage mechanism 108 is docked to the container lifting machine 1041.

The temporary storage mechanism 108 is configured to bear the target container, and convey the target container to the container lifting machine 1041, and/or transfer the target container away from the container lifting machine 1041. The container lifting machine 1041 is configured to transport the target container to a target storey corresponding to the transportation task.

In one embodiment of the present application, a certain storey A is provided with one self-driven robot B and one temporary storage mechanism C. The control device can control the self-driven robot B to pick up the target container at a first target position of the storey A, transport the target container to the temporary storage mechanism C for storage, and then the control device can control the temporary storage mechanism C to convey the target container to the container lifting machine. When other containers are also transported to the storey A by the container lifting machine, a controller can further control the temporary storage mechanism C to convey the target container away from the container lifting machine and to the temporary storage mechanism C, and control the self-driven robot A to pick up the target container at the temporary storage mechanism C and transport the target container to a second target position of the container.

In the embodiment of the present application, a cross-layer transportation of the container 101 is achieved by the container lifting machine 1041, and the container lifting machine 1041 cooperates with the temporary storage mechanism 108 to dock to the self-driven robot 103. For example, after the self-driven robot 103 picks up the target container, the control device 105 dispatches the self-driven robot 103 to transfer the target container to the temporary storage mechanism 108, the temporary storage mechanism 108 transports the target container to the container lifting machine 1041, and after the container lifting machine 1041 transports the target container to the target storey, the target container is transferred to a corresponding temporary storage mechanism 108 and waits to be taken away by a corresponding self-driven robot 103.

In one embodiment, the temporary storage mechanism 108 may be a roller table mechanism, such as track lines or conveyor belts, and the temporary storage mechanism 108 has a hierarchical structure of n. The control device 105 is further configured to control the container lifting machine 1041 to transport the target container to an idle hierarchy in the temporary storage mechanism 108, where n is a natural number and n is greater than or equal to 2. The number of hierarchies of the temporary storage mechanism 108 can be designed and adjusted according to a user service situation.

In one embodiment, as shown in FIG. 8 and FIG. 13, the temporary storage mechanism is disposed on one or two sides of the container lifting machine 1041, and the container lifting machine 1041 is disposed corresponding to the temporary storage mechanism. In a case where the temporary storage mechanism is disposed on two sides of the container lifting machine, a temporary storage mechanism disposed on one side of the container lifting machine 1041 is configured to feed the container 101 into the container lifting machine 1041; and a temporary storage mechanism disposed on the other side of the container lifting machine 1041 is configured to send the container 101 out of the container lifting machine 1041, and a feed-in operation and a send-out operation may be completed successively or synchronously.

In one embodiment, the container lifting machine 1041 includes a transfer mechanism 10412 and a container temporary position 10411. The transfer mechanism 10412 is configured to load a target container from the temporary storage mechanism into the container temporary position 10411, and/or load a target container on the container temporary position 10411 into the temporary storage mechanism.

In one embodiment, the transfer mechanism 10412 includes a roller mechanism or a robot arm, and the roller mechanism or the robot arm has a degree of freedom in four directions front, back, left and right of a horizontal plane, such that the container lifting machine 1041 can dock to the temporary storage mechanism 108 in multiple directions.

A working process of the embodiment of the present application is described below. Under the control of the control device 105, the self-driven robot 103 acquires a container 101 that needs to be transported across floors to another floor. According to factors such as a floor to which the container 101 is to go, an optimal path of the self-driven robot 103 to the container lifting machine 1041 and a queuing situation of the self-driven robot 103 in front of the container lifting machine 1041, the control device 105 allocates the self-driven robot 103 to a temporary storage mechanism 108 docking to a corresponding container lifting machine 1041, such that at least one container 101 is sequentially fed into the corresponding container lifting machine 1041. When at least one container 101 is lifted to the target storey, the temporary storage mechanism 108 moves the container 101 out of the container lifting machine 1041 and temporarily stores the container 101. The control device 105 reallocates the self-driven robot 103 to the temporary storage mechanism 108 to take out the container 101, and transport the container 101 to the operating station 106 of the storage region for picking. After the picking is completed, a cross-layer transfer return of the container 101 is implemented according to the above-mentioned mode.

In the robot control system provided by the embodiment of the present application, a problem of items-to-man picking of three-dimensional storage is solved by adopting the self-driven robot 103 combined with a loft shelf. The passage for the self-driven robot 103 to move through is provided on the floor of each storey of the loft 107, and the container lifting machine 1041 is combined to transport the target container to each target floor, such that the self-driven robot can run on each storey, thereby improving an efficiency of the warehouse in terms of cross-layer logistics transmission. The temporary storage mechanism 108 docking to the self-driven robot 103 is disposed at a position of the container lifting machine 1041, such that the container lifting machine 1041 can also operate normally under a condition that no self-driven robot 103 is idle temporarily, and the cross-layer transmission of the containers 101 of different storeys is achieved in a flexible and efficient form, thereby improving the efficiency and flexibility of the whole robot picking system, and reducing a cost of a container cross-layer transmission scheme.

FIG. 2 shows a communication framework of a robot control device according to an embodiment of the present application.

Components of the control device 105 include, but are not limited to, a memory 210 and a processor 220. The processor 220 is connected to the memory 210 through a bus 230, and a database 250 is used for storing the transportation task.

The control device 105 further includes an access device 240 that enables the control device 105 to communicate through one or more networks 260. Examples of the networks include a public switched telephone network (PSTN), a local area network (LAN), a wide area network (WAN), a personal area network (PAN), or a combination of communication networks such as the Internet. The access device 240 may include one or more of any type of network interfaces (such as, a network interface card (NIC)) of wired or wireless, such as an IEEE 802.11 wireless local area networks (WLAN) wireless interface, a worldwide interoperability for microwave access (Wi-MAX) interface, an ethernet interface, a universal serial bus (USB) interface, a cellular network interface, a bluetooth interface and a near field communication (NFC) interface.

In one embodiment of the present application, the above-mentioned of the control device 105 and other components not shown in FIG. 2 may also be connected to each other, for example, by the bus.

The control device 105 may be any type of stationary or mobile computing device including a mobile computer or mobile computing device (such as, a tablet computer, a personal digital assistant, a laptop computer, a notebook computer and a netbook), a mobile phone (such as a smart phone), a wearable computing device (such as a smart watch and smart glasses) or other types of mobile devices, or a stationary computing device such as a desktop computer or a personal computer (PC). The control device 105 may further be a mobile or stationary server.

The control device 105 is communicatively connected to the self-driven robot 103 and the lifting machine through the network 260, and controls the robot control system by transmitting control instructions or receiving a message returned by the self-driven robot or the lifting machine.

In another embodiment of the present application, the transportation task carries a code identifier of the target container. The control device 105 is further configured to control at least one self-driven robot 103 to move to a location of the target container according to a travel route on a storey where the self-driven robots 103 is located, and pick up the target container by checking the code identifier of the target container.

It is to be noted that the embodiment of the present application does not limit a structure of the self-driven robot, and a function of taking out the container from the shelf and putting the container into the shelf can be achieved by any of the structures in the existing art. For example, a mechanical arm may be arranged on the self-driven robot, and the mechanical arm is utilized to take out the container from the shelf and put the container into the shelf; a clamping structure may also be arranged on the self-driven robot, and the container is taken out from the shelf and put into the shelf in a clamping mode; or the container may be taken out from the shelf and put into the shelf by using other structures. For example, exemplarily, referring to FIG. 3, in one embodiment of the present application, the at least one self-driven robot 103 includes a pickup telescopic mechanism 301, a lifting mechanism 302, and a robot moving chassis 303. The pickup telescopic mechanism 301 is configured to obtain one or more target containers. The lifting mechanism 302 is configured to adjust the pickup telescopic mechanism 301 to move upwards or downwards such that the pickup telescopic mechanism obtains target containers on shelves of different heights of the target storey.

The robot moving chassis 303 is configured to control the at least one self-driven robot to move through on a travel passage of the storey where the self-driven robot is located according to the travel route planned by the control device.

The target container is the container 101 which needs to be transported in the transportation task.

The self-driven robot 103 provided by the embodiment of the present application runs on the travel passage on the floor of the loft 102, such that the flexibility for transporting the container is greatly improved, the various operations can be completed according to the actual requirements, and there is no need to install shuttle tracks, thereby greatly reducing the construction cost.

In another embodiment of the present application, the temporary storage mechanism 108 includes a first temporary storage roller line, a second temporary storage roller line and a transfer position, the transportation task includes a first transportation task, and a destination of the first transportation task includes a transfer position corresponding to the first temporary storage roller line. The control device 105 is further configured to control a first self-driven robot in the at least one self-driven robot 103 to pick up the target container at a location of the target container of the storey where the target container is located according to a first travel route corresponding to the first transportation task. The control device 105 is further configured to control the first self-driven robot to transport the target container to the transfer position corresponding to the first temporary storage roller line. The first self-driven robot is configured to transmit a ready status signal to the control device 105. The control device 105 is further configured to receive the ready status signal, and control the first temporary storage roller line to transport the target container to the container lifting machine 1041.

The transportation task further includes a second transportation task, and a destination of the second transportation task includes a transfer position corresponding to the second temporary storage roller line. The control device 105 is further configured to control the container lifting machine 1041 to transport the target container to a target storey of the second transportation task. The control device 105 is further configured to control the container lifting machine 1041 to transport the target container to the transfer position corresponding to the second temporary storage roller line. The container lifting machine 1041 is further configured to transmit a status signal waiting for receiving items to the control device 105.

The transportation task further includes a third transportation task, and a destination of the third transportation task includes an operating station 106 or a container carrier of the target storey of the second transportation task. The control device 105 is further configured to receive the status signal waiting for receiving items and control a second self-driven robot in the at least one self-driven robot 103 to move through on a storey where the second self-driven robot is located according to a third travel route corresponding to the third transportation task. The control device 105 is further configured to control the second self-driven robot to transport the target container to the operating station 106 or the container carrier of the target storey of the second transportation task from the transfer position corresponding to the second temporary storage roller line. The first self-driven robot is different from the second self-driven robot.

In the embodiment of the present application, the transportation task consists of the first transportation task, the second transportation task and the third transportation task. The first temporary storage roller line and the second temporary storage roller line correspond to a box-placing temporary storage roller line for acquiring the container 101 and a box-taking temporary storage roller line for temporarily storing the container 101 respectively. Transfer positions for docking to the self-driven robots are disposed on the box-taking temporary storage roller line and the box-placing temporary storage roller line. An operation process of the transportation task of this embodiment is described below. The self-driven robot 103 transports the obtained container 101 to the transfer position corresponding to the box-placing temporary storage roller line. The box-placing temporary storage roller line feeds the container 101 into the container lifting machine 1041. After the container 101 arrives at the target storey, the container lifting machine 1041 transfers the container 101 to the box-taking temporary storage roller line, where the box-taking temporary storage roller line is configured to have a multi-layer form. The control device 105 can move the container 101 into an idle layer according to a free condition of the box-taking temporary storage roller line. The control device 105 controls the self-driven robot 103 on the target storey to move to the box-taking temporary storage roller line to take out one or more containers 101. The control device 105 again dispatches a self-driven robot 103 that has completed a box-taking operation to transport the container 101 to the operating station 106 on the target storey.

In the embodiment of the present application, the temporary storage mechanism further includes a third temporary storage roller line, and the third temporary storage roller line and the second temporary storage roller line are disposed on two sides of the container lifting machine 1041 respectively. The transportation task further includes a fourth transportation task, and a destination of the fourth transportation task includes a target storey of the fourth transportation task.

The control device 105 is further configured to control the third temporary storage roller line to transport a container 101 located on a transfer position of the third temporary storage roller line to the container lifting machine 1041.

The control device 105 is further configured to control the container lifting machine 1041 to transport the container 101 to the target storey of the fourth transportation task.

The third temporary storage roller line corresponds to the box-placing temporary storage roller line used for acquiring the container 101. A feed-in operation of the box-placing temporary storage roller line and a send-out operation of the box-taking temporary storage roller line may be completed synchronously.

In another embodiment of the present application, the storage region includes at least one storage layer and one picking layer. The operating station 106 is disposed on the picking layer, and the operating station 106 is configured to perform a task operation on the target container.

In one embodiment, the control device 105 is further configured to control the self-driven robot 103 to carry the target container to the operating station 106, and the self-driven robot 103 queues up at the operating station 106 to wait for the task operation. The control device 105 is further configured to, after the task operation is completed, control the self-driven robot 103 to carry the target container with which the task operation has been completed and transport the target container to a next operating station 106 or return the target container to the container carrier of the loft 107.

In one embodiment, in order to improve a working efficiency of the self-driven robot 103, the control device 105 is further configured to, after the self-driven robot 103 is controlled to arrive at the operating station 106, control the self-driven robot 103 to transport the target container to the container carrier of the operating station 106, and obtain at least one operable container 101 other than the target container by controlling a pickup telescopic mechanism disposed on the self-driven robot 103.

The operable container may be the container 101 that has completed the task operation.

In another embodiment of the present application, the control device 105 is further configured to receive a target container code identified by the self-driven robot 103 and perform a popularity evaluation for the target container based on a popularity and quantity of items stored in the target container.

The control device 105 is further configured to control the self-driven robot 103 to transport a target container whose popularity exceeds a preset threshold to a container carrier in a preset region, and record a binding relationship between the target container and the container carrier. Alternatively, the control device 105 is further configured to control the self-driven robot 103 to transport the target container to a container carrier of the loft 107 by an increasing distance from the operating station 106 of the loft 107 according to a descending order of the popularity of the target container, and record a binding relationship between the target container and the container carrier.

The preset region may be a region where a storage unit which is relatively close to the operating station 106 is located, for example, may be a container carrier 3 meters or 5 meters away from the operating station 106. In this way, a container 101 in which frequently taken and used items are located is stored in a container carrier which is relatively close to the operating station, thus reducing time required for transporting and improving a business processing efficiency.

A container carrier is a shelf placed on each storey of the loft 107 of the storage region, each container carrier has a plurality of storage units, and each storage unit can store one container.

In one embodiment, the container carrier includes, but is not limited to, storage shelves placed on each storey of the loft 107 of the storage region. Each container carrier has a plurality of storage units, and each storage unit can store one container.

A storage position of the operating station includes a storage shelf or a temporary storage roller table, and the storage position is used for storing the container on the operating station.

In another embodiment of the present application, the passage for the self-driven robot 103 to move through can be used for emergency manual operation.

Figure 9:
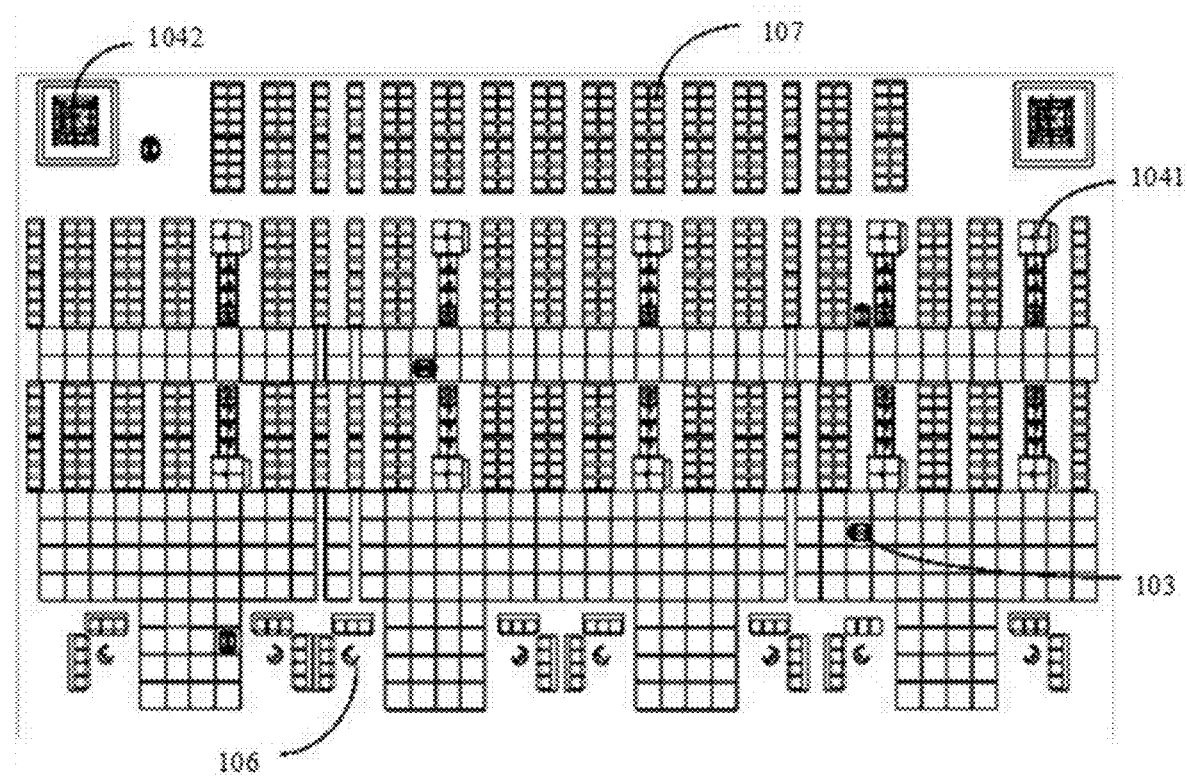
FIG. 9 is a plan view of a storey of a storage region in a robot control system according to an embodiment of the present application.

In another embodiment of the present application, as shown in FIG. 9, the robot system further includes a robot lifting machine 1042. The robot lifting machine 1042 is configured to dispatch the self-driven robot 103 to a corresponding target storey according to control instructions of the control device 105 when business volumes of different target storeys change.

In the embodiment of the present application, as illustrated in FIG. 9, an operation flow of a container cross-layer transmission scheme includes the following steps.

In step (1), the control device 105 allocates the self-driven robot 103 on the target storey to acquire one or more target containers in the storage region, and the control device 105 allocates the self-driven robot 103 to a designated container lifting machine 1041 to perform a cache operation according to positions of the self-driven robot 103 and the container lifting machine 1041 and a queuing situation of the self-driven robot 103.

In step (2), when the self-driven robot 103 arrives at a docking position of the designated container lifting machine 1041, if a transfer position of the box-placing temporary storage roller line is idle, the control device 105 controls the self-driven robot 103 to place the target container on the transfer position of the box-placing temporary storage roller line, and the box-placing temporary storage roller line feeds the target container to the container lifting machine 1041; and if the transfer position of the box-placing temporary storage roller line is not idle, the self-driven robot 103 waits for a box-placing instruction at the transfer position of the box-placing temporary storage roller line.

In step (3), when the container lifting machine 1041 transports the target container to the target storey, the control device 105 controls a transfer device to transfer the target container from the container lifting machine 1041 to the box-taking temporary storage roller line, and meanwhile allocates the self-driven robot 103 to a docking point of a corresponding container lifting machine 1041 to pick up the target container.

In step (4), after the self-driven robot 103 picks up the target container at the transfer position of the box-taking temporary storage roller line, the self-driven robot 103 moves to a place designated by the control device 105 to perform a designated operation.

In step (5), after the designated operation is completed, the control device 105 allocates the target container back to an original position, and the target container is returned to the original position according to step 101 to step 104.

In step (6), when the business volumes of different target storeys change, the control device 105 reallocates the number of the self-driven robots 103 on each floor, and the self-driven robot 103 is dispatched to a designated target storey by the robot lifting machine 1042.

In addition, the storage region may further be provided with a walking ladder or an elevator.

When a system goes wrong, for example, when power is off, or the system is unable to work normally, workers perform the transportation task on travel passages of each storey through the walking ladder or the elevator to complete the emergency manual operation.

In order to accurately determine a position of the container 101, the container 101 is provided with the code identifier for identification, and the code identifier may be a two-dimensional code, a RFID tag and the like.

Based on the robot operating system described above, a variety of business processes can be completed. A put-in storage process of full container load, a put-in storage process and a work flow of the operating station 107 are described as an example below.

A replenishment process refers to that items are not put in storage together with the container 101 and the items are put in the existing container 101. The work at the operating station 107 includes works such as out-of-warehouse, stock-taking or tallying.

In the embodiment of the present application, the put-in storage process of full container load includes steps described below.

In step (1), the control device 105 receives a container number, a product number, and a quantity of the items and records a binding relationship between the container number, the product number, and the quantity of the items and the container 101, where one container 101 can bind various items.

In step (2), the control device 105 determines that if there is an empty container on the container carrier of the storage region or the temporary storage mechanism 108, the control device allocates the self-driven robot 103 to obtain the empty container 101 and transport the empty container 101 to the operating station 106, and controls the self-driven robot 103 to queue up at the operating station 106. If there is no empty container 101 on the container carrier of the storage region or the temporary storage mechanism 108, the control device 105 directly controls the self-driven robot 103 to queue up at the operating station 106. The cross-layer transmission of the container 101 is achieved by the container lifting machine 1041 and the temporary storage mechanism 108 in a transportation path.

In step (3), the self-driven robot 103 obtains the container 101, detects the code identifier of the container 101 and submits the code identifier to the control device 105, and the control device 105 records a container number of the container transported by the self-driven robot 103.

In step (4), the control device 105 allocates the container 101 to a storage unit of a corresponding container shelf according to a popularity and quantity of items in the container 101.

In step (5), when containers 101 are put into all container temporary storage positions of the self-driven robot 103, or there is no remaining container 101 to be put into storage at the operating station 106, the control device 105 dispatches the self-driven robot 103 to leave the operating station 106 and plans an optimal path sequence for returning the container for the self-driven robot 103, and the self-driven robot 103 moves to positions of allocated storage units sequentially and puts the container 101 into the storage unit. The cross-layer transmission of the container 101 is achieved by the container lifting machine 1041 and the temporary storage mechanism 108 in a return path.

In the embodiment of the present application, the replenishment process includes steps described below.

In step (1), the control device 105 selects a plurality of containers 101 capable of storing items according to items needing to be stored in the storage. The plurality of containers 101 may be empty containers 101 or containers 101 having items but still having a storage space. The control device 105 allocates the self-driven robot 103 to obtain the container 101, transport the container 101 to the operating station 106 and queue up at the operating station 106. The cross-layer transmission of the container 101 is achieved by the container lifting machine 1041 and the temporary storage mechanism 108 in a transportation path.

In step (2), the control device 105 receives a product code and a container code, records a binding relationship between the container 101 and the items, and controls the self-driven robot 103 to receive the items through the container 101.

In step (3), when the replenishment operation is completed currently at the operating station or a container 101 currently carried by the self-driven robot 103 has no storage space, workers make a feedback through an interactive interface of the control device 105, and the control device 105 allocates the container 101 to a storage unit of a corresponding container shelf according to the popularity and quantity of the items in the container 101.

In step (4), the control device 105 dispatches the self-driven robot 103 to leave the operating station 106, and plans an optimal return path sequence for the self-driven robot 103. The self-driven robot 103 moves to positions of storage units of the container carrier allocated by the control device 105 and puts the container 101 into the storage unit of the container carrier. The cross-layer transmission of the container 101 is achieved by the container lifting machine 1041 and the temporary storage mechanism 108 in a return path.

In the embodiment of the present application, the work flow of the operating station 106 includes steps described below.

In step (1), the operating station 106 starts a work, and the control device 105 hits a plurality of containers 101 according to a work document. The control device 105 allocates the self-driven robot 103 to obtain the hit containers 101, transport the hit containers 101 to the operating station 106 according to the planned transportation path, and queue up at the operating station 106. The cross-layer transmission of the container 101 is achieved by the container lifting machine 1041 and the temporary storage mechanism 108 in the transportation path.

In step (2), after the work at the operating station 106 is completed, that an operation on the container 101 carried currently by the self-driven robot 103 is completed is fed back to the control device 105 through the interactive interface of the control device 105.

In step (3), the control device 105 allocates the container 101 to a storage unit of a corresponding container carrier according to a current popularity and quantity of items in the container 101.

In step (4), the control device 105 dispatches the self-driven robot 103 to leave the operating station 106, and plans an optimal return path sequence for the self-driven robot 103. The self-driven robot 103 moves to positions of storage units of the container carrier allocated by the control device 105 and puts the container 101 into the storage unit of the container carrier. The cross-layer transmission of the container 101 is achieved by the container lifting machine 1041 and the temporary storage mechanism 108 in the return path.

In the robot control system provided by the embodiment of the present application, the passage for the self-driven robot 103 to move through is provided on the floor of each storey of the loft and the lifting machine is combined, such that the self-driven robot 103 can run on each storey. In this way, the flexibility of the self-driven robot 103 is improved, the various operations can be completed according to the actual requirements, and there is no need to install shuttle tracks, thereby greatly reducing the construction cost.

Figure 10:
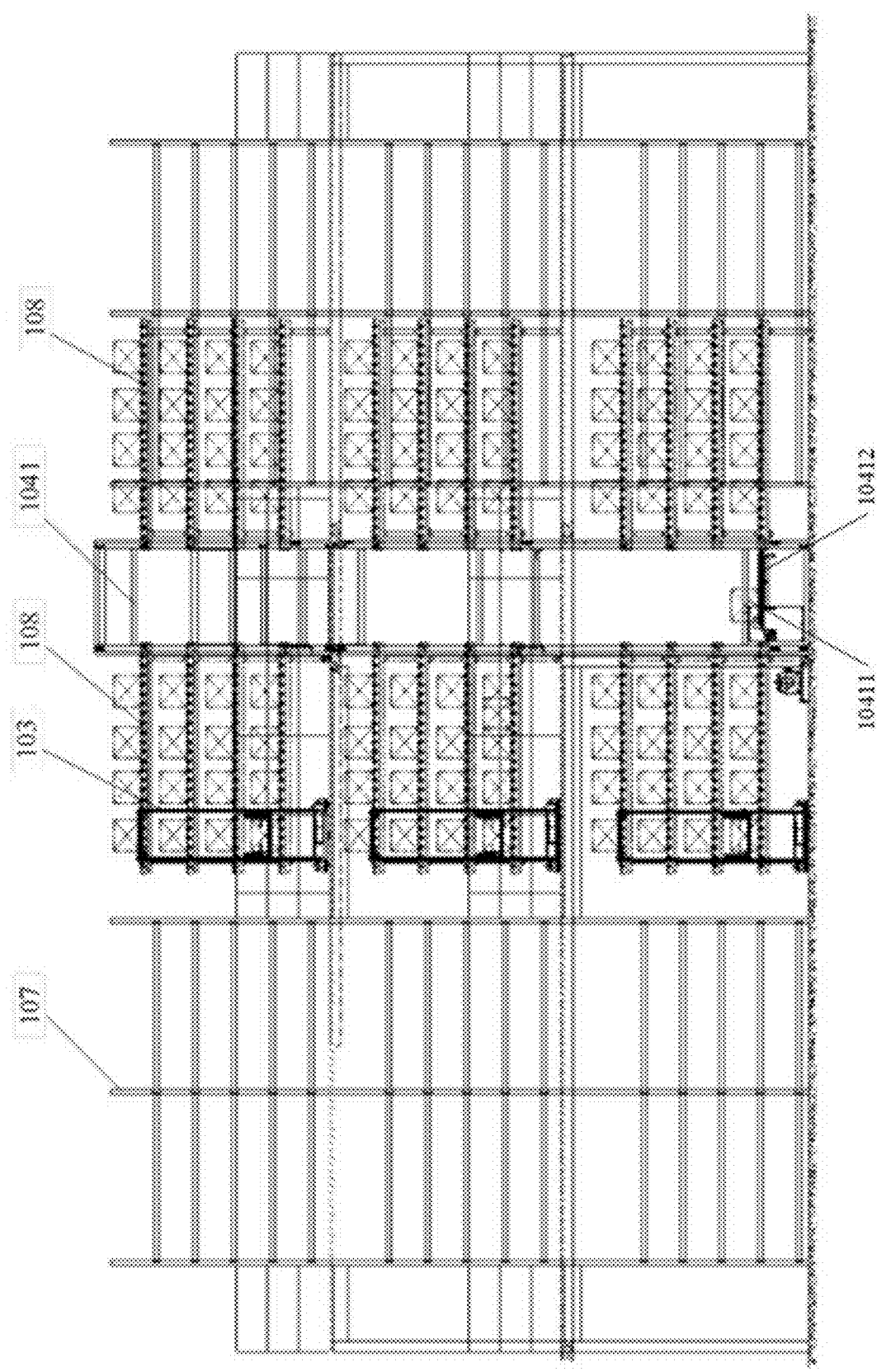
FIG. 10 is a flowchart of a robot control method according to an embodiment of the present application.

The processor 220 can perform steps in the method illustrated in FIG. 10. FIG. 10 shows an exemplarily flow-chart of a robot control method according to an embodiment of the present application, and the robot control method includes step 1001 to step 1005.

In step 1001, a transportation task is assigned to a self-driven robot.

In step 1002, a travel route on a storey where the self-driven robot is located is planned for the self-driven robot according to the transportation task, and the self-driven robot is controlled to obtain a target container at a first target position on the storey where the self-driven robot is located and transport the target container to the temporary storage mechanism 108.

In the embodiment of the present application, the transportation task carries a code identifier of the target container.

The step of controlling the self-driven robot to pick up the target container at the first target position on the storey where the self-driven robot is located includes steps described below.

At least one self-driven robot is controlled to move to a location of the target container on the storey where the self-driven robot is located according to the travel route and pick up the target container by recognizing the code identifier of the target container.

In the embodiment of the present application, the transportation task includes a first task, and the step of controlling the self-driven robot to pick up the target container at the first target position on the storey where the self-driven robot is located includes a step described below. A first self-driven robot in the at least one self-driven robot is controlled to pick up the target container at the location of the target container on the storey where the self-driven robot is located according to a first travel route corresponding to the first transportation task.

In the embodiment of the present application, the temporary storage mechanism is a roller table mechanism, the temporary storage mechanism includes a first temporary storage roller line and a transfer position, and a destination of the first transportation task includes the transfer position corresponding to the first temporary storage roller line.

Transporting the target container to the temporary storage mechanism includes controlling the first self-driven robot to transport the target container to the transfer position corresponding to the first temporary storage roller line.

In step 1003, the temporary storage mechanism 108 is controlled to transport the target container to a container lifting machine.

Controlling the temporary storage mechanism to transport the target container to the container lifting machine includes steps described below. A status signal that the first self-driven robot is ready is received. The first temporary storage roller line is controlled to transport the target container to the container lifting machine.

In step 1004, the container lifting machine is controlled to transport the target container to a target storey where the destination of the transportation task is located.

In the embodiment of the present application, the transportation task further includes a second transportation task, and a destination of the second transportation task includes a target storey of the second transportation task. Controlling the container lifting machine to transport the target container to the target storey where the destination of the transportation task is located includes a step described below. The container lifting machine is controlled to transport the target container to the target storey of the second transportation task.

Figure 11:
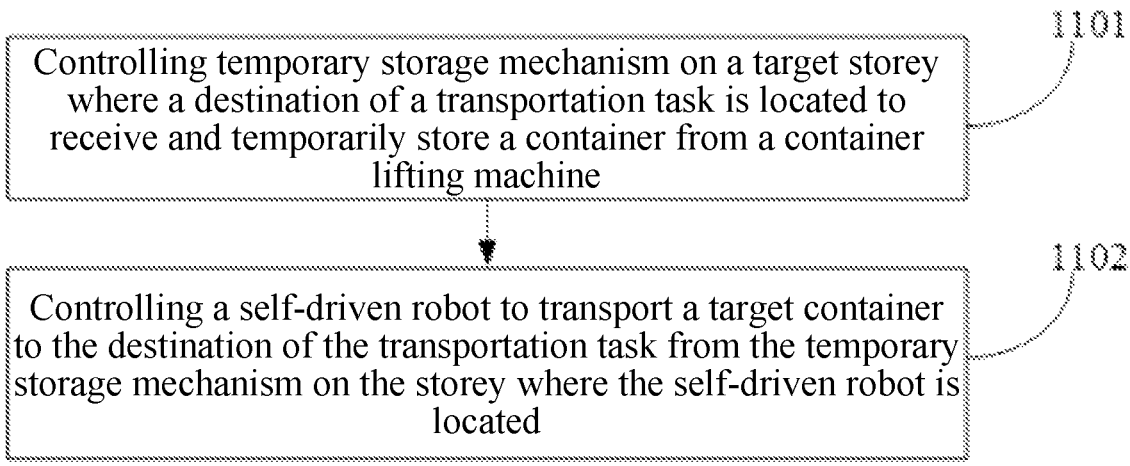
FIG. 11 is a flowchart of a robot control method according to another embodiment of the present application.

The processor 220 can perform steps in the method illustrated in FIG. 11. FIG. 11 shows an exemplarily flow-chart of a robot control method according to an embodiment of the present application, and the robot control method includes step 1101 to step 1102.

In step 1101, a temporary storage mechanism on a target storey where a destination of a transportation task is located is controlled to receive and temporarily store a container from the container lifting machine.

In the embodiment of the present application, the temporary storage mechanism is a roller table mechanism, and the temporary storage mechanism includes a second temporary storage roller line and a transfer position. The transportation task further includes a second transportation task, and a destination of the second transportation task includes the transfer position corresponding to the second temporary storage roller line. Controlling the temporary storage mechanism on the target storey where the destination of the transportation task is located to receive and temporarily store the container from the container lifting machine includes a step described below. The container lifting machine is controlled to transport the target container to the transfer position corresponding to the second temporary storage roller line.

In step 1102, the self-driven robot is controlled to transport the target container to the destination of the transportation task from the temporary storage mechanism on the storey where the self-driven robot is located.

In the embodiment of the present application, the transportation task further includes a third transportation task, and a destination of the third transportation task includes an operating station or a container carrier of the target storey of the second transportation task.

Controlling the self-driven robot to transport the target container to the destination of the transportation task from the temporary storage mechanism on the storey where the self-driven robot is located includes steps described below. A status signal waiting for receiving items is received. A second self-driven robot in the at least one self-driven robot is controlled to move through on a storey where the second self-driven robot is located according to a third travel route corresponding to the third transportation task. The second self-driven robot is controlled to transport the target container to the operating station or the container carrier of the target storey of the second transportation task from the transfer position corresponding to the second temporary storage roller line. The first self-driven robot is different from the second self-driven robot.

In the embodiment of the present application, the temporary storage mechanism further includes a third temporary storage roller line, and the third temporary storage roller line and the second temporary storage roller line are disposed on two sides of the container lifting machine respectively. The transportation task further includes a fourth transportation task, and a destination of the fourth transportation task includes a target storey of the fourth transportation task.

After the container lifting machine is controlled to transport the target container to the transfer position corresponding to the second temporary storage roller line, the method further includes steps described below. The third temporary storage roller line is controlled to transport a container on a transfer position of the third temporary storage roller line to the container lifting machine. The container lifting machine is controlled to transport the container to the target storey of the fourth transportation task.

In the embodiment of the present application, the destination of the transportation task includes a container carrier of a loft. Controlling the self-driven robot to transport the target container to the destination of the transportation task from the temporary storage mechanism on the storey where the self-driven robot is located includes steps described below. A code of a target container that has completed a picking transmitted by the self-driven robot is received. A popularity of the target container is evaluated according to a popularity and quantity of items stored in the target container that has completed the picking. The self-driven robot is controlled to transport a target container whose popularity exceeds a preset threshold to a container carrier in a preset region, and a binding relationship between the target container and the container carrier is recorded; or the self-driven robot is controlled to transport the container to a container carrier by an increasing distance from the operating station of the loft according to a descending order of the popularity of the container, and a binding relationship between the target container and the container carrier is recorded.

Figure 12:
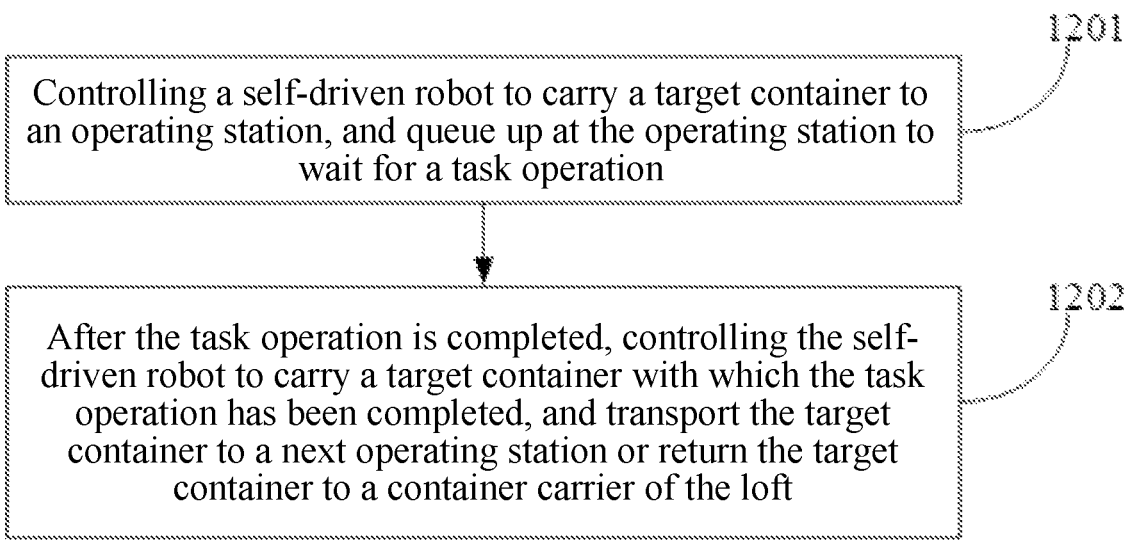
FIG. 12 is a flowchart of a robot control method according to yet another embodiment of the present application.

In the embodiment of the present application, as illustrated in FIG. 12, after the self-driven robot is controlled to transport the target container to the destination of the transportation task from the temporary storage mechanism on the storey where the self-driven robot is located, the method further includes step 1201 to step 1202.

In step 1201, the self-driven robot is controlled to carry the target container to the operating station, and queue up at the operating station to wait for the task operation.

In step 1202, after the task operation is completed, the self-driven robot is controlled to carry the target container with which the task operation has been completed, and transport the target container to a next operating station or return the target container to the container carrier of the loft.

In the embodiment of the present application, after the self-driven robot is controlled to transport the target container to the destination of the transportation task from the temporary storage mechanism on the storey where the self-driven robot is located, the method further includes a step described below. After the self-driven robot is controlled to arrive at the operating station, the control device controls the self-driven robot to transport the target container to the storage position of the operating station, and obtain one or more other operable containers 101 by controlling a pickup telescopic mechanism disposed on the self-driven robot.

In the robot control method provided by the embodiment of the present application, the container lifting machine is combined, such that the container lifting machine can cooperate with the self-driven robot 103 to move through on travel passages of different storeys. In this way, the flexibility of the self-driven robot 103 is greatly improved, the various operations can be completed according to the actual requirements, and there is no need to install the shuttle tracks, thereby greatly reducing the construction cost.

One embodiment of the present application further provides a computing device, including a memory, a processor and computer instructions stored in the memory and operable on the processor, and when the computer instructions are executed, the processor implements the step of the previously described robot control method.

One embodiment of the present application further provides a computer-readable storage medium storing computer-executable instructions. When the computer-executable instructions are executed, a processor implements the step of the previously described robot control method.

The above is a schematic scheme of a computer-readable storage medium of this embodiment. It is to be noted that the technical scheme of the storage medium belongs to a same concept as the technical scheme of the above-mentioned robot control method, and detailed contents of the technical scheme of the storage medium that are not described in detail can refer to the description of the technical scheme of the above-mentioned robot control method.

The above describes specific embodiments of the present specification. Other embodiments are within the scope of the appended claims. In some cases, the actions or steps recorded in the claims may be performed in a different order than in the embodiments and the desired results may still be achieved. In addition, the processes depicted in the drawings do not necessarily require a shown specific order or successive order to achieve the desired results. In some embodiments, multitasking and parallel processing are also possible or may be advantageous.

The computer instructions include computer procedure code, and the computer procedure code may be in forms such as a source code form, an object code form, an executable file form, or some intermediate form. The computer-readable medium may include any entity or apparatus capable of carrying the computer procedure code, a recording medium, a U disk, a mobile hard disk, a magnetic disk, an optical disk, a computer memory, a read-only memory (ROM), a random access memory (RAM), an electric carrier signal, a telecommunication signal, a software distribution medium, and the like. It is to be noted that the content contained in the computer-readable medium may be appropriately increased or decreased according to the requirements of legislation and patent practice in jurisdictions, for example, in some jurisdictions, according to the legislation and patent practice, the computer-readable medium does not include the electrical carrier signal and the telecommunication signal.

It is to be noted that for simple description, the foregoing method embodiments are all expressed as a series of action combinations. However, those skilled in the art should understand that the present application is not limited by the described action sequences, and according to the present application, some steps may be performed in other sequences or concurrently. Secondly, it is also to be understood by those skilled in the art that the embodiments described in the specification are exemplary embodiments and that the actions and modules involved are not necessarily necessary for the present application.

In the foregoing embodiments, the description of each embodiment has its own focus. For the portion that is not detailed in one embodiment, reference may be made to the related description of other embodiments.

What is claimed is:

1. A robot control system, comprising:
a storage region, wherein the storage region comprises a loft having at least two storeys and is configured to store a container, and a passage for a self-driven robot to move through is provided on a floor of each of the at least two storeys of the loft, each of the at least two storeys of the loft is provided with at least one self-driven robot and at least one temporary storage mechanism, and the self-driven robot is capable of traveling on a storey where the self-driven robot is located;
a control device, wherein the control device is configured to assign a transportation task to the self-driven robot and plan a travel route on the storey where the self-driven robot is located for the self-driven robot according to the transportation task, and control the self-driven robot to travel on the storey where the self-driven robot is located according to the travel route and perform the transportation task; wherein the transportation task comprises at least one of the following: a task that the self-driven robot picks up a target container at a first target position of the storey where the self-driven robot is located, and transport the target container to the temporary storage mechanism; or, a task that the self-driven robot picks up the target container at the temporary storage mechanism and transports the target container to a second target position of the storey where the self-driven robot is located; and
a container lifting machine, wherein the container lifting machine is configured to transport the target container to a target storey corresponding to a transportation task;
wherein the temporary storage mechanism is configured to bear the target container and perform at least one of: conveying the target container to the container lifting machine; or conveying the target container out of the container lifting machine;
wherein the control device is communicatively connected to the container lifting machine, the temporary storage mechanism, and the self-driven robot.

2. The robot control system of claim 1, wherein the temporary storage mechanism is a roller line.

3. The robot control system of claim 1, wherein the temporary storage mechanism is an n-layer structure, where n is a natural number and is greater than or equal to 2; and
the control device is further configured to control the container lifting machine to transport the target container to an idle level in the temporary storage mechanism.

4. The robot control system of claim 1, wherein the at least one temporary storage mechanism is disposed on one or both sides of the container lifting machine, and the container lifting machine is disposed corresponding to the at least one temporary storage mechanism.

5. The robot control system of claim 1, wherein the transportation task carries a code identifier of the target container, and
the control device is configured to control the self-driven robot to travel on the storey where the self-driven robot is located to the location of the target container according to the travel route, and control the self-driven robot to pick up the target container by recognizing the code identifier of the target container.

6. The robot control system of claim 1, wherein the control device is further configured to receive a target container code recognized by the self-driven robot and evaluate a popularity of the target container based on a popularity and a quantity of items stored in the target container; and
control the at least one self-driven robot to transport a target container with a popularity exceeding a preset threshold to a container carrier in a preset region, and record a binding relationship between the target container and the container carrier; or control the at least one self-driven robot to transport target containers to container carriers by an increasing distance from an operating station according to a descending order of the popularity of the target containers, and record the binding relationship between the target containers and the container carriers.

7. The robot control system of claim 1, wherein the at least one self-driven robot comprises a pickup telescopic mechanism, a lifting mechanism, and a robot moving chassis;
wherein the pickup telescopic mechanism is configured to pick up at least one target container;
the lifting mechanism is configured to adjust the pickup telescopic mechanism to move upwards or downwards thus allowing the pickup telescopic mechanism picks up target containers on container carriers at different heights on the target storey; and
the robot moving chassis is configured to control travelling the at least one self-driven robot on a travel passage of the target storey.

8. The robot control system of claim 1, wherein the passage configured for the at least one self-driven robot to move through is further configured for an emergency manual operation.

9. The robot control system of claim 1, further comprising a robot lifting machine configured to dispatch the self-driven robot to a corresponding target storey according to control instructions of the control device when business volumes of different target storeys change.

10. The robot control system of claim 1, wherein the lifting machine further comprises a transfer mechanism and a container temporary position,
   wherein the transfer mechanism is configured to perform at least one of:
   loading the target container from the temporary storage mechanism onto the container temporary position; or
   loading the target container located on the container temporary position onto the temporary storage mechanism.

11. The robot control system of claim 10, wherein the transfer mechanism comprises a roller mechanism or a robot arm configured to endow the container with degrees of freedom in four directions comprising front, rear, left, and right in a horizontal plane.

12. The robot control system of claim 1, wherein the storage region comprises at least one storage layer and one picking layer, and the picking layer is provided with an operating station, wherein the operating station is configured to perform a task operation on the target container.

13. The robot control system of claim 12, wherein the control device is configured to control the self-driven robot to carry the target container to the operating station, and queue at the operating station to wait for the task operation; and
   the control device is further configured to, after the task operation is completed, control the self-driven robot to carry the target container with which the task operation has been completed, and transport the target container to a next operating station or return the target container to a container carrier.

14. The robot control system of claim 12, wherein the control device is further configured to control the self-driven robot to transport the target container to a storage position of the operating station, and pick up at least one operable container other than the target container by controlling a pickup telescopic mechanism disposed on the self-driven robot, after controlling the self-driven robot to travel to the operating station.

15. A robot control method, applied to a robot control system, wherein the robot control system comprises a loft having at least two storeys, a passage for a self-driven robot to move through is provided on a floor of each of the at least two storeys of the loft, each of the at least two storeys of the loft is provided with at least one self-driven robot and at least one temporary storage mechanism, and the self-driven robot is capable of traveling on a storey where the self-driven robot is located,
   the method comprising:
   assigning a transportation task to a first self-driven robot;
   planning a travel route on the storey where the first self-driven robot is located corresponding to the transportation task for the first self-driven robot, controlling the first self-driven robot to move to a first target location on the storey where the first self-driven robot is located according to the travel route, pick up a target container, and transport the target container to the temporary storage mechanism;
   controlling the temporary storage mechanism to transport the target container to a container lifting machine;
   controlling the container lifting machine to transport the target container to a target storey where a destination of the transportation task is located;
   controlling the at least one temporary storage mechanism on a target storey where the destination of the transportation task is located to receive and temporarily store the target container from the container lifting machine; and
   controlling a second self-driven robot to transport the target container to the destination of the transportation task from the at least one temporary storage mechanism on a storey where the second self-driven robot is located.

16. A computing device, comprising a memory, a processor, and computer instructions stored in the memory and executable by the processor, wherein the computer instructions are configured to, when executed by the processor, be included for
   assigning a transportation task to a first self-driven robot;
   planning a travel route on a storey where the first self-driven robot is located corresponding to the transportation task for the first self-driven robot, controlling the first self-driven robot to move to a first target location on the storey where the first self-driven robot is located according to the travel route, pick up the target container, and transport the target container to a temporary storage mechanism;
   controlling the temporary storage mechanism to transport the target container to a container lifting machine;
   controlling the container lifting machine to transport the target container to a target storey where a destination of the transportation task is located;
   controlling the temporary storage mechanism on a target storey where the destination of the transportation task is located to receive and temporarily store the target container from the container lifting machine; and
   controlling a second self-driven robot to transport the target container to the destination of the transportation task from the temporary storage mechanism on a storey where the second self-driven robot is located;
   wherein the first self-driven robot is capable of traveling on the storey where the first self-driven robot is located, and the second self-driven robot is capable of traveling on a storey where the second self-driven robot is located.

* * * * *